(12) United States Patent
Takao

(10) Patent No.: US 11,082,604 B2
(45) Date of Patent: Aug. 3, 2021

(54) IMAGE CAPTURING APPARATUS, METHOD OF CONTROLLING THE SAME, CAMERA SYSTEM, AND STORAGE MEDIUM

(71) Applicant: CANON KABUSHIKI KAISHA, Tokyo (JP)

(72) Inventor: Yumi Takao, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/886,956

(22) Filed: May 29, 2020

(65) Prior Publication Data
US 2020/0389598 A1 Dec. 10, 2020

(30) Foreign Application Priority Data
Jun. 5, 2019 (JP) .............................. JP2019-105608

(51) Int. Cl.
*H04N 5/232* (2006.01)
*G03B 13/36* (2021.01)

(52) U.S. Cl.
CPC ....... *H04N 5/232121* (2018.08); *G03B 13/36* (2013.01); *H04N 5/232122* (2018.08)

(58) Field of Classification Search
CPC ....... H04N 5/232121; H04N 5/232122; H04N 5/232123; G03B 13/36
See application file for complete search history.

(56) References Cited

U.S. PATENT DOCUMENTS

| | | | |
|---|---|---|---|
| 9,843,710 B2 | 12/2017 | Hamano et al. | |
| 10,122,911 B2 | 11/2018 | Takao | |
| 10,326,924 B2 | 6/2019 | Takao | |
| 2008/0265130 A1* | 10/2008 | Colomb | G03H 1/0866 250/201.9 |
| 2014/0240550 A1* | 8/2014 | Taniguchi | H04N 5/3696 348/239 |
| 2014/0293117 A1* | 10/2014 | Murakami | H04N 5/23296 348/349 |
| 2016/0119603 A1* | 4/2016 | Hayashi | H04N 9/646 348/222.1 |
| 2017/0004603 A1* | 1/2017 | Irie | H04N 5/23229 |

FOREIGN PATENT DOCUMENTS

| | | |
|---|---|---|
| JP | 2004-085725 A | 3/2004 |
| JP | 2010-078810 A | 4/2010 |
| JP | 6478457 B2 | 3/2019 |

* cited by examiner

*Primary Examiner* — Shahbaz Nazrul
(74) *Attorney, Agent, or Firm* — Venable LLP

(57) ABSTRACT

An image capturing apparatus comprises an image sensor for capturing a subject image, a focus detection unit configured to, based on an image signal obtained by photoelectrically converting the subject image while performing a scan operation that causes a focus lens to move along an optical axis, calculate a focus evaluation value and detect a position of the focus lens at which the focus evaluation value is a maximum, and a calculation unit configured to, in a case where the imaging optical system includes a reflective optical system, calculate, based on information on the reflective optical system and information on an image forming position for each of a plurality of different spatial frequencies, a correction value for correcting a focus detection result of the focus detection unit.

12 Claims, 18 Drawing Sheets

FIG. 4A
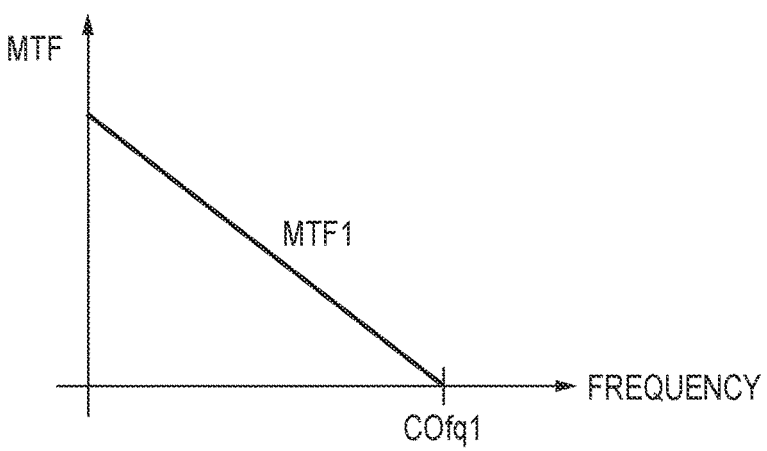
FIG. 4B
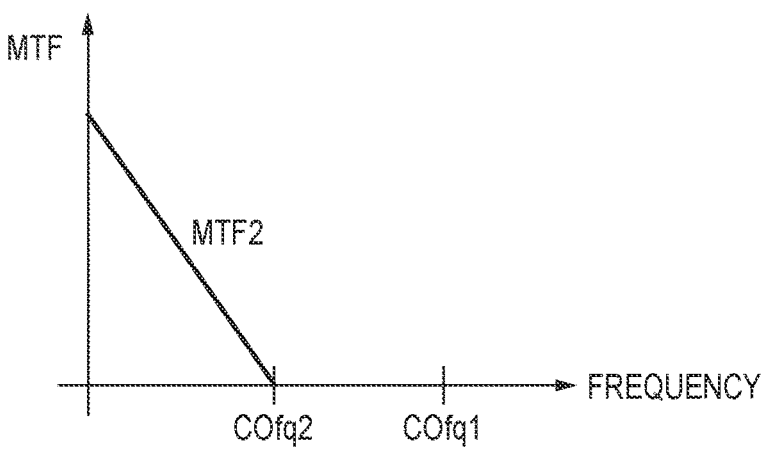
FIG. 4C
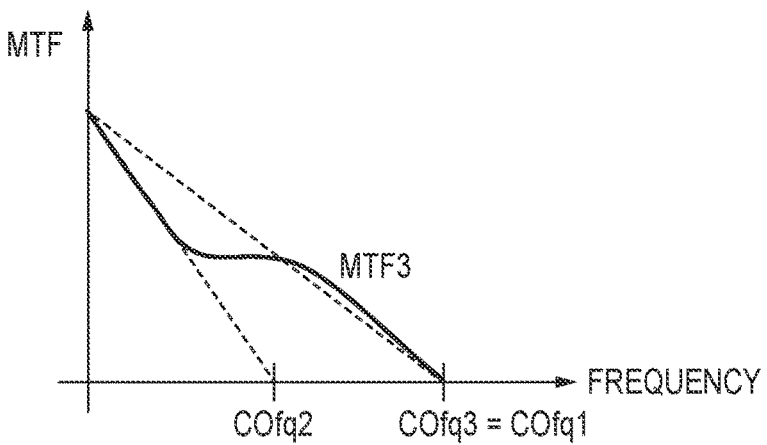
FIG. 5
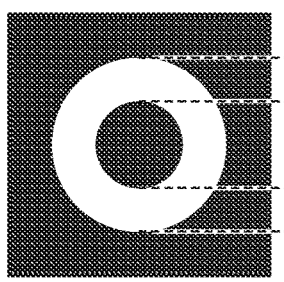 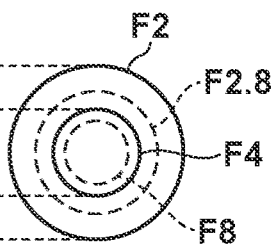

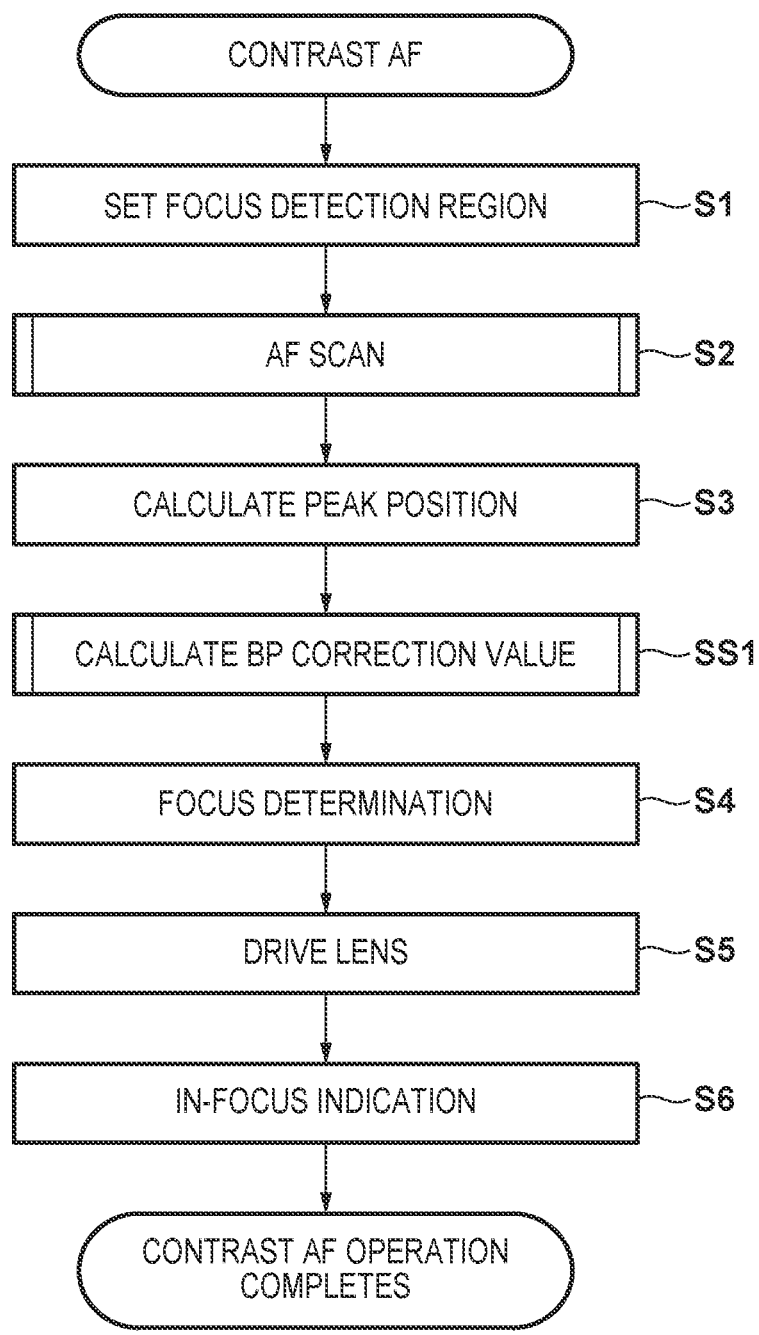

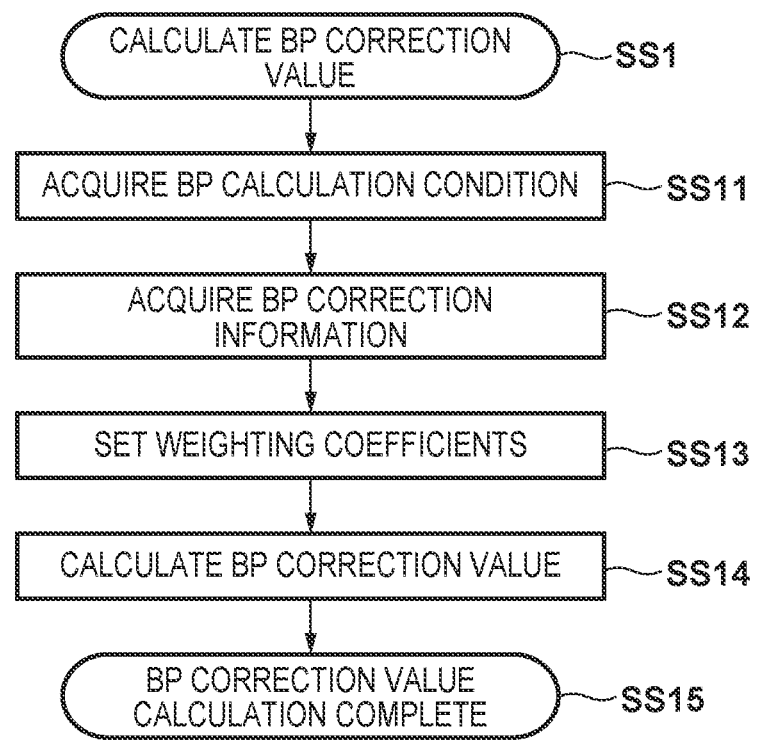
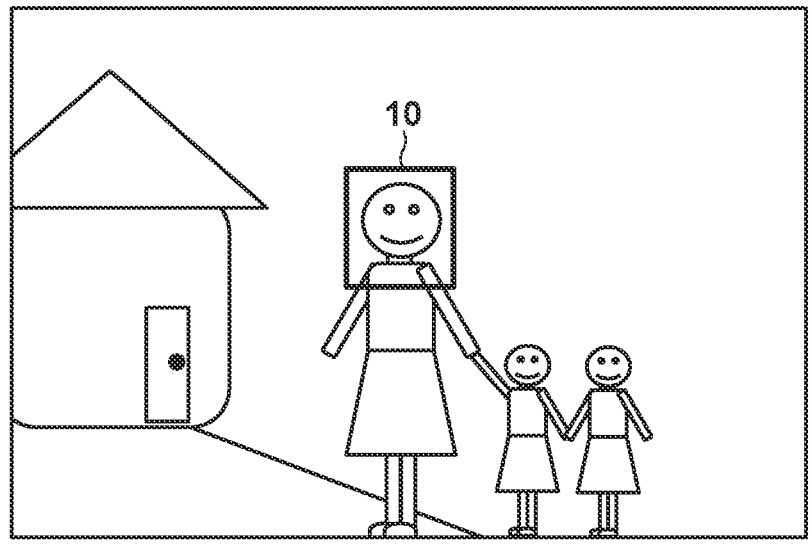
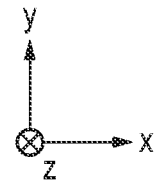

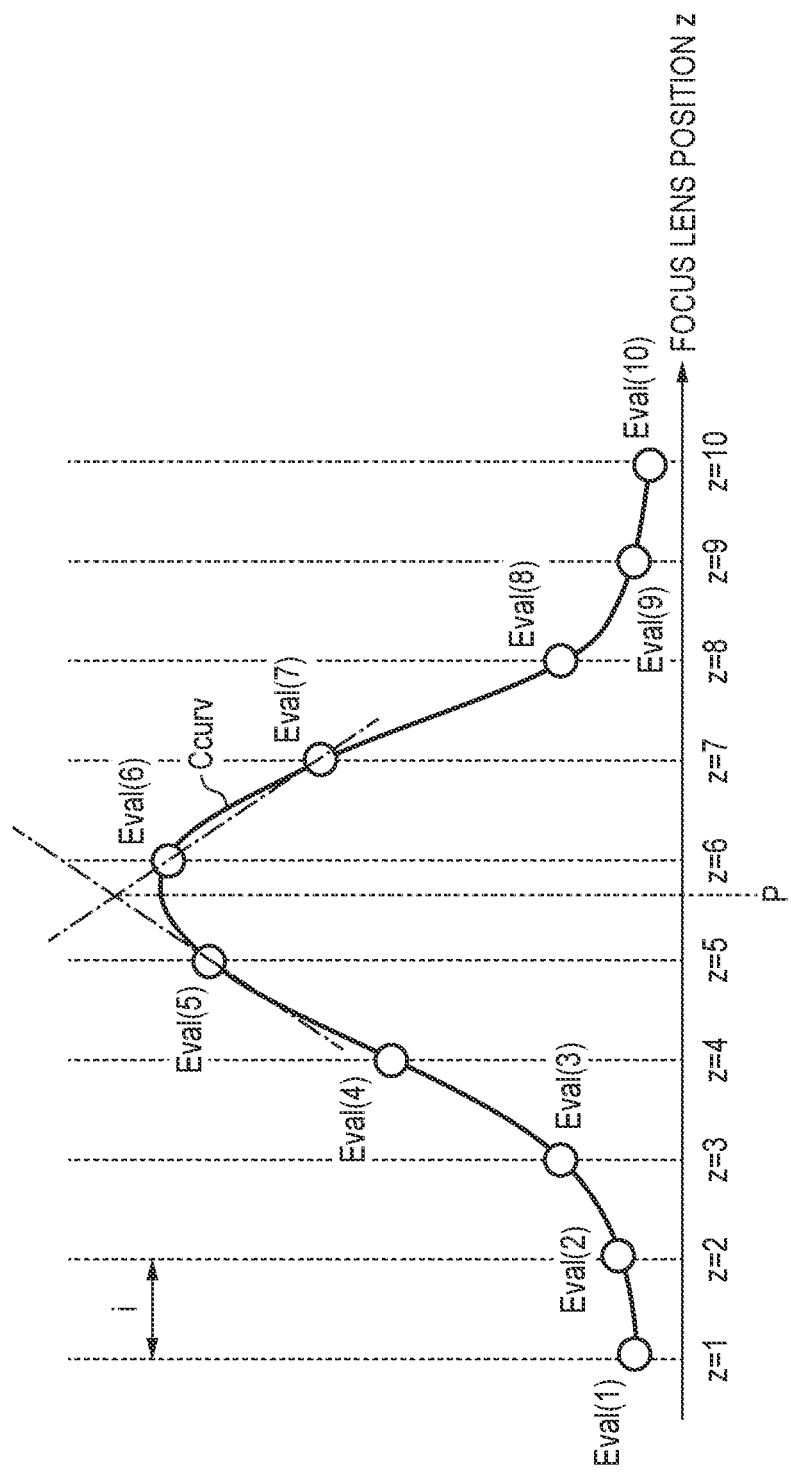

F I G. 13

| CAPTURING F VALUE | Filter TO BE SELECTED | | | |
|---|---|---|---|---|
| | NORMAL LENS | | LENS HAVING REFLECTIVE OPTICAL SYSTEM (OUTER DIAMETER F2, INNER/OUTER DIAMETER DIFFERENCE F4) | |
| | TIME OF COARSE SCAN | TIME OF FINE SCAN | TIME OF COARSE SCAN | TIME OF FINE SCAN |
| ~1.4 | 2 | 3 | | |
| 2.0 | 2 | 3 | | |
| 2.8 | 1 | 2 | | |
| 4.0 | 1 | 2 | 1 | 3 |
| 5.6 | 1 | 1 | | |
| 8.0~ | 1 | 1 | | |

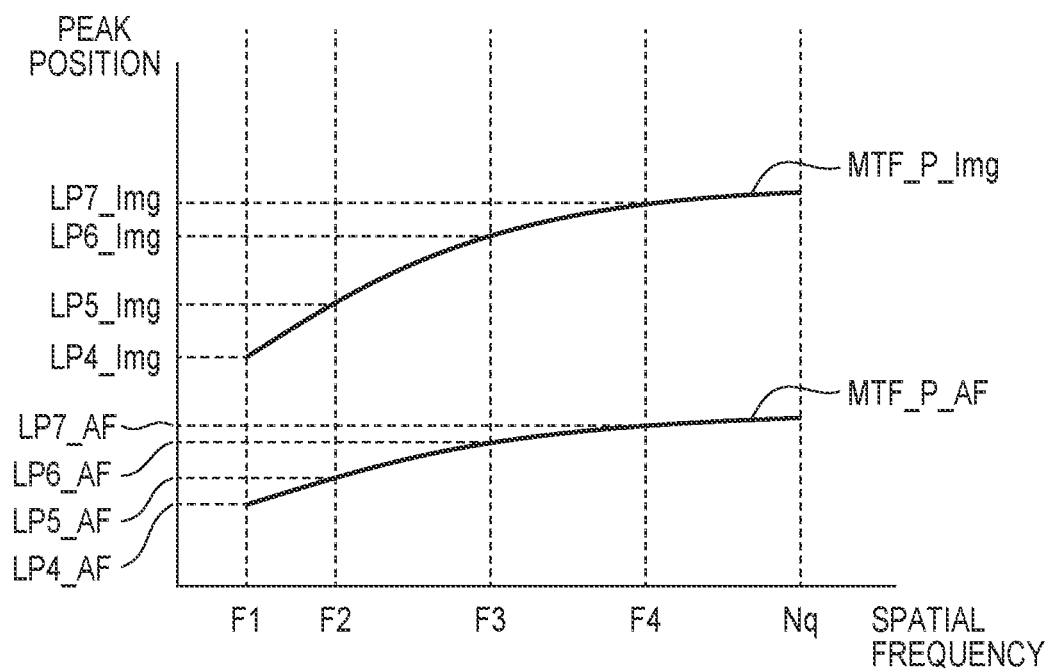

F I G. 17A
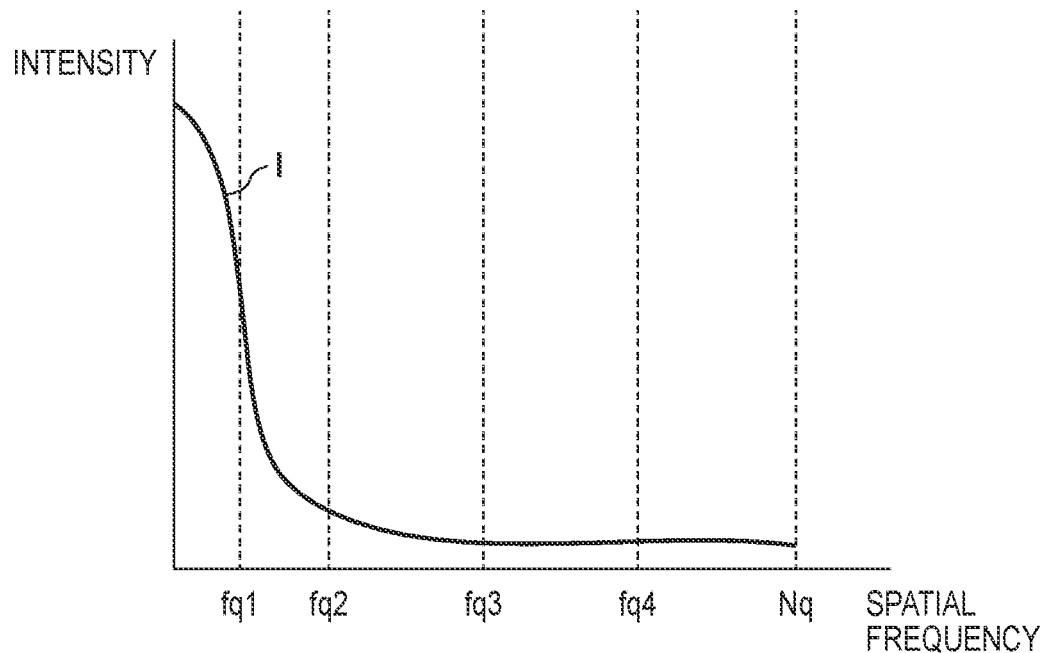
F I G. 17B
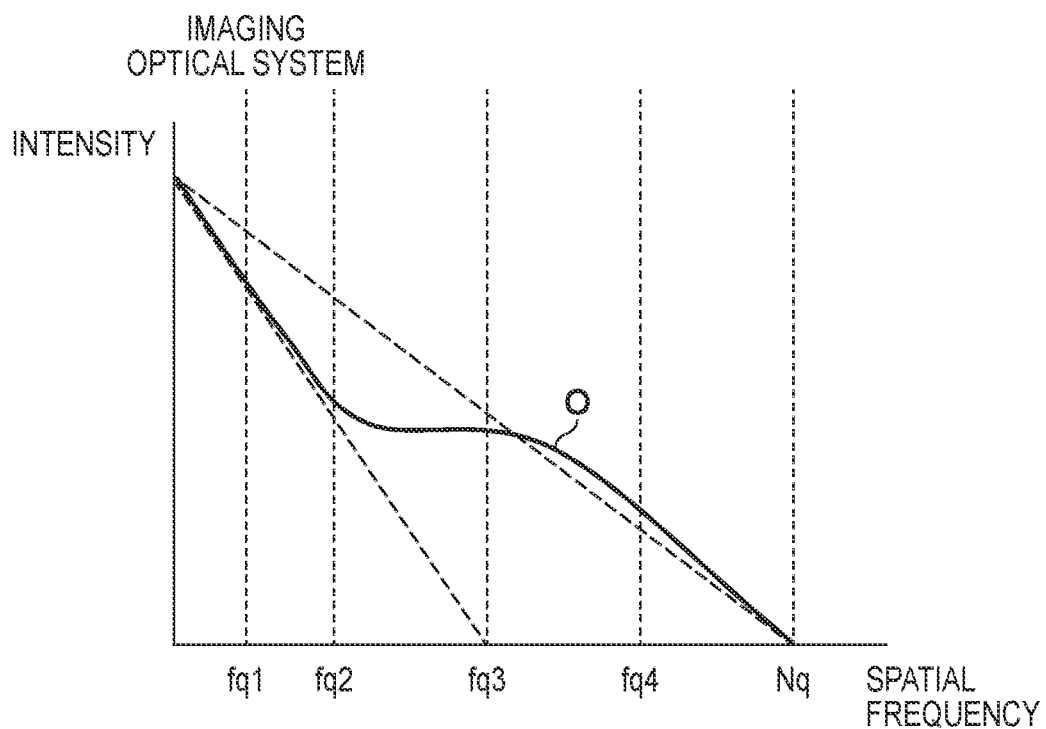

SENSITIVITY AT TIME OF VIEWING, AND DIGITAL FILTER

IMAGE CAPTURING APPARATUS, METHOD OF CONTROLLING THE SAME, CAMERA SYSTEM, AND STORAGE MEDIUM

BACKGROUND OF THE INVENTION

Field of the Invention

The present invention relates to a focus adjustment technique in an image capturing apparatus.

Description of the Related Art

In recent years, an optical system that is a miniaturized imaging lens with a long focal length on the optical axis of which a reflecting mirror is disposed has been proposed (see Japanese Patent Laid-Open No. 2004-85725). In the imaging optical system disclosed in Japanese Patent Laid-Open No. 2004-85725, an imaging lens capable of capturing at a high magnification is realized by internally reflecting light using a reflecting mirror, which enables a long focal length while having a small outer shape.

As typical focus adjustment methods for an image capturing apparatus, a contrast autofocus (AF) method and a phase difference autofocus (AF) method are known. Both the contrast AF method and the phase difference AF method are AF methods frequently used in video cameras and digital still cameras, and there are some systems in which an image sensor is used as a focus detection sensor. In these types of focus adjustment methods, an error may be included in a focus detection result due to various aberrations of an optical system, and various methods for reducing the error have been proposed. For example, Japanese Patent No. 6478457 proposes a method of calculating a correction value for correcting a difference between a focus state of a captured image and a focus detection result.

However, the conventional image capturing apparatus described in the above patent document has the following problems.

In an imaging optical system such as that disclosed in Japanese Patent Laid-Open No. 2004-85725, due to the presence of a reflective optical system in which there is internal reflection, change in accordance with a focal position in an MTF (Modulation Transfer Function), which is an absolute value of an optical transfer function (OTF) indicating a resolution of an imaging lens, differs from change in a normal imaging lens. Therefore, with the same focus detection control as that of a normal imaging lens, focus detection accuracy is lower.

Further, with the correction value calculation in Japanese Patent No. 6478457, if the correction value is not calculated in consideration of the MTF of the reflective optical system, the accuracy of the focus detection correction is lower.

SUMMARY OF THE INVENTION

The present invention has been made in view of the above-mentioned problems, and improves the accuracy of focus adjustment in an image capturing apparatus that uses an imaging lens having a reflective optical system.

According to a first aspect of the present invention, there is provided an image capturing apparatus, comprising: an image sensor configured to capture a subject image; and at least one processor or circuit configured to function as a focus detection unit configured to, based on an image signal obtained by photoelectrically converting the subject image in accordance with the image sensor while performing a scan operation that causes a focus lens included in an imaging optical system to move along an optical axis of the imaging optical system, calculate a focus evaluation value indicating a degree of focus of a subject and detect a position of the focus lens at which the focus evaluation value is a maximum, and a calculation unit configured to, in a case where the imaging optical system includes a reflective optical system in which a part of a light beam is blocked, calculate, based on information on the reflective optical system and information on an image forming position of the imaging optical system for each of a plurality of different spatial frequencies, a correction value for correcting a focus detection result of the focus detection unit.

According to a second aspect of the present invention, there is provided a camera system in which an imaging lens is configured to be detachably attached to a camera body, wherein the imaging lens includes a reflective optical system in which a part of a light beam is blocked, and has a storage device that stores information on the reflective optical system and information on an image forming position of the imaging lens for each of a plurality of different spatial frequencies, and the camera body has an image sensor configured to capture a subject image, and at least one processor or circuit configured to function as a focus detection unit configured to, based on an image signal obtained by photoelectrically converting the subject image in accordance with the image sensor while performing a scan operation that causes a focus lens included in the imaging lens to move along an optical axis of the imaging lens, calculate a focus evaluation value indicating a degree of focus of a subject and detect a position of the focus lens at which the focus evaluation value is a maximum; and a calculation unit configured to calculate, based on information on the reflective optical system and information on an image forming position of the imaging lens for each of a plurality of different spatial frequencies, a correction value for correcting a focus detection result of the focus detection unit.

According to a third aspect of the present invention, there is provided a method for controlling an image capturing apparatus provided with an image sensor operable to capture a subject image, the method comprising: based on an image signal obtained by photoelectrically converting the subject image in accordance with the image sensor while performing a scan operation that causes a focus lens included in an imaging optical system to move along an optical axis of the imaging optical system, performing focus detection in which a focus evaluation value indicating a degree of focus of a subject is calculated and a position of the focus lens at which the focus evaluation value is a maximum is detected; and in a case where the imaging optical system includes a reflective optical system in which a part of a light beam is blocked, calculating, based on information on the reflective optical system and information on an image forming position of the imaging optical system for each of a plurality of different spatial frequencies, a correction value for correcting a focus detection result of the focus detection.

According to a fourth aspect of the present invention, there is provided a non-transitory computer-readable storage medium storing a program for causing a computer to execute each step of a method of controlling an image capturing apparatus provided with an image sensor operable to capture a subject image, the method comprising: based on an image signal obtained by photoelectrically converting the subject image in accordance with the image sensor while performing a scan operation that causes a focus lens included in an imaging optical system to move along an optical axis of the imaging optical system, performing focus detection in which a focus evaluation value indicating a degree of focus of a subject is calculated and a position of the focus lens at which the focus evaluation value is a maximum is detected; and in a case where the imaging optical system includes a reflective optical system in which a part of a light beam is blocked, calculating, based on information on the reflective optical system and information on an image forming position of the imaging optical system for each of a plurality of different spatial frequencies, a correction value for correcting a focus detection result of the focus detection.

Further features of the present invention will become apparent from the following description of exemplary embodiments with reference to the attached drawings.

BRIEF DESCRIPTION OF THE DRAWINGS

FIGS. 4A to 4C are diagrams for describing MTFs.

FIG. 5 is a diagram for describing the correspondence between a diameter and an F value of a reflective optical system.

FIGS. 6A to 6C are flowcharts for describing a focus detection operation.

FIG. 7 is a view for describing a focus detection region.

FIG. 8 is a view for describing a focus detection evaluation value.

FIG. 13 is a diagram for describing focus detection frequency settings.

FIG. 16C is a view for describing BP correction information and weighting coefficients.

FIG. 16D is a diagram for describing BP correction information and weighting coefficients.

FIG. 17A is a diagram for describing a method of calculating weighting coefficients.

FIG. 17B is a diagram for describing a method of calculating weighting coefficients.

DESCRIPTION OF THE EMBODIMENTS

Figure 1A:
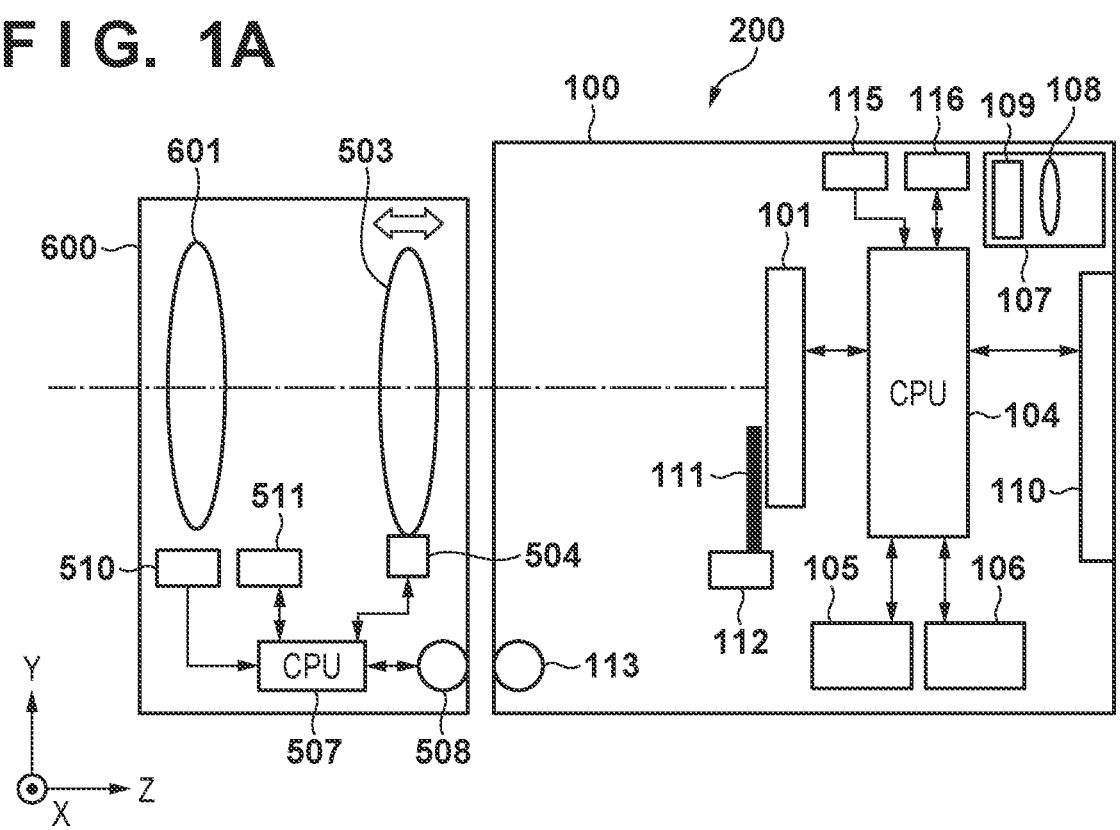
FIGS. 1A and 1B are diagrams showing a configuration of an interchangeable lens type digital camera system which is an embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Image Capturing Apparatus

Figure 1B:
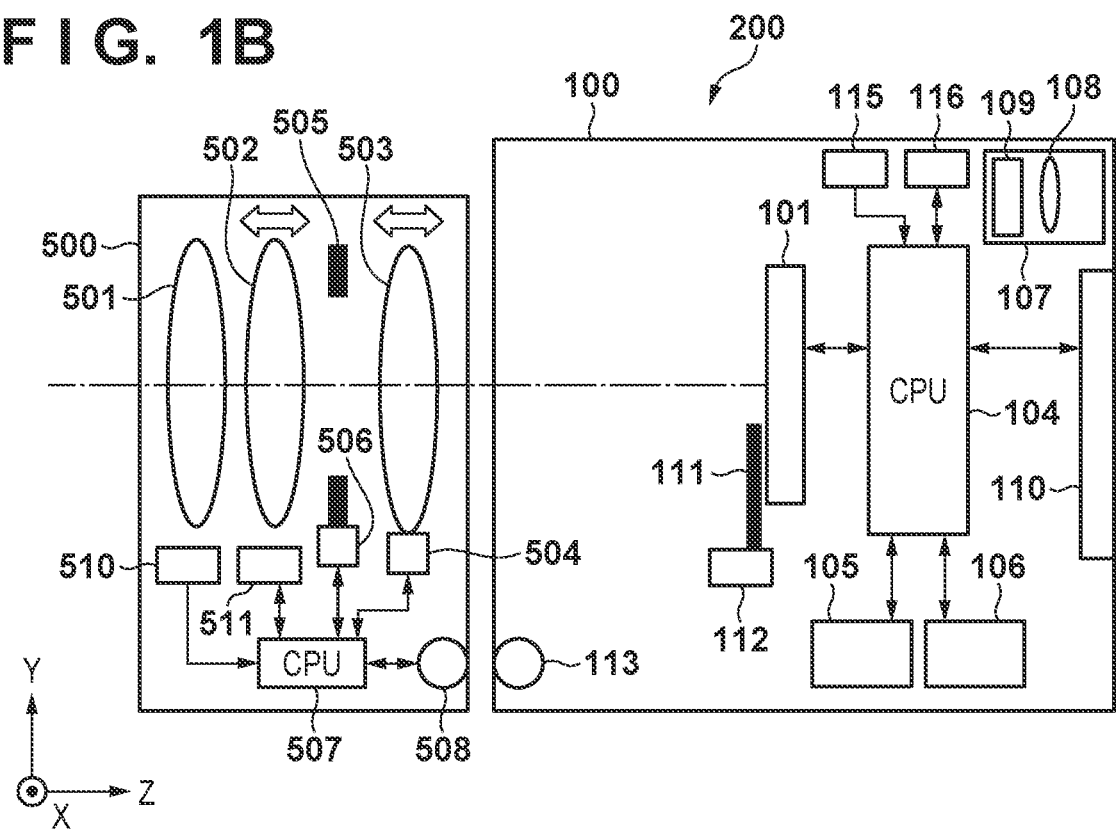

FIGS. 1A and 1B are diagrams showing a configuration of an interchangeable lens type digital camera system 200 which is an embodiment of an image capturing apparatus of the present invention. The digital camera system 200 is configured by having a camera body 100, and an imaging lens 500 or an imaging lens 600, for example, which are mounted on the camera body 100 in an interchangeable (detachable) manner. FIG. 1A shows a state in which the imaging lens 600 which has a reflective optical system is mounted on the camera body 100, and FIG. 1B shows a state in which the imaging lens 500 which is normal (does not have a reflective optical system) is mounted on the camera body 100.

The imaging lens 500 and the imaging lens 600 are different types of lenses that are mounted interchangeably with respect to the camera body 100. A light beam transmitted through each lens group in the imaging lens 500 (or 600) is guided to the image sensor 101 that receives the subject image and performs photoelectric conversion. The image sensor 101 is configured by including pixel portions arranged in a matrix for converting a subject image into an electric signal. A pixel signal obtained by converting a subject image into an electric signal by the image sensor 101 is, in the camera CPU 104, subjected to various correction processes for obtaining an image signal and a focus detection signal, processes for converting the pixel signal into a live view image, a recorded image, or an EVF image, and the like. In the present embodiment, these processes and the like are performed by the camera CPU 104, but configuration may be taken such that a dedicated circuit is provided, and these processes are performed by this circuit.

An operation member 105 is various members for setting an imaging mode and image capturing conditions of the camera (such as the F value, ISO sensitivity, and exposure time). A storage medium 106 is a flash memory, and is a medium for recording a captured still image or a moving image. An in-viewfinder display 107 is configured by being provided with a small and high-definition display 109 such as an organic EL display or a liquid crystal display, and an eyepiece 108. An external display 110 is configured by an organic EL display or a liquid crystal display having a screen size suitable for being viewed with the naked eye. Various types of information such as the setting state of the camera body 100, the live view image, and the captured image are displayed on the in-viewfinder display 107 and the external display 110.

A focal plane shutter 111 is disposed on a front surface of the image sensor 101. A shutter driving unit 112 is, for example, a motor, and controls an exposure time for a time of capturing a still image by driving and controlling blades of the shutter. A camera-side communication terminal 113 is provided in a camera mount part for mounting the imaging lens 500 (or 600). The camera-side communication terminal 113 and a lens-side communication terminal 508 provided in the lens mount part are connected to each other, thereby enabling communication between the camera CPU 104 and a later-described lens CPU 507.

The camera CPU 104 is connected to a nonvolatile memory 115 comprising a ROM or the like and a volatile memory 116 comprising a RAM or the like. The camera CPU 104 deploys a program stored in the nonvolatile memory 115 into the volatile memory 116 and executes the program to thereby control the entire digital camera system 200. The nonvolatile memory 115, which is a storage unit in the camera body, also stores various types of information for operations other than programs, information on characteristics of a plurality of types of imaging lenses, and the like.

The imaging lens 500 (or 600) is detachable in relation to the camera body 100, and in FIG. 1A, the imaging lens 600 which has a reflective optical system is shown, and in FIG. 1B, the imaging lens 500 which is a zoom lens having a variable focal length is shown. The type of the lens mounted on the camera body 100 is not relevant.

A light beam from a subject passes through the first lens group 501 or 601, the second lens group 502 (only in FIG. 1B), and the third lens group 503, and is formed as a subject image on the image capturing surface of the image sensor 101 in the camera body 100. The first lens group 601 is a lens group having a reflective optical system which is a characteristic of the present embodiment. A detailed configuration will be described later.

The second lens group 502 functions as a variator (variable magnification lens) for performing magnification variation by advancing and retracting in the optical axis direction. The third lens group 503 functions as a focus lens for performing focus adjustment by advancing and retracting in the optical axis direction. The third lens group 503 is driven by a focus driving unit 504 which uses a stepping motor or the like.

The aperture 505 existing only in FIG. 1B is configured by a plurality of aperture blades for adjusting the amount of light entering the imaging lens. An aperture driving unit 506 narrows and drives the aperture blades until a predetermined capturing F value is obtained. In the reflective optical system of FIG. 1A, since it is difficult to install an aperture mechanism composed of an aperture and an aperture driving unit, an aperture mechanism is not present, and in principle usage is performed only with an open F value. The lens CPU 507 communicates with the camera CPU 104 via the lens-side communication terminal 508 and the camera-side communication terminal 113, transmits and receives various kinds of information, and drives and controls the focus driving unit 504 and the aperture driving unit 506 based on commands from the camera CPU 104.

The lens CPU 507 is connected to a nonvolatile memory 510 comprising a ROM or the like and a volatile memory 511 comprising a RAM or the like. The lens CPU 507 deploys a program stored in the nonvolatile memory 510 into the volatile memory 511 and executes the program to thereby control the entire imaging lens 500 (or 600). The nonvolatile memory 510 also stores, for example, identification numbers and optical information unique to the imaging lens other than the program.

Although a zoom range and the open F value of the imaging lens 500 are designed according to the intention of capturing, the imaging lens 600 which has a reflective optical system basically does not have a zoom lens or an imaging aperture control mechanism.

Figure 2:
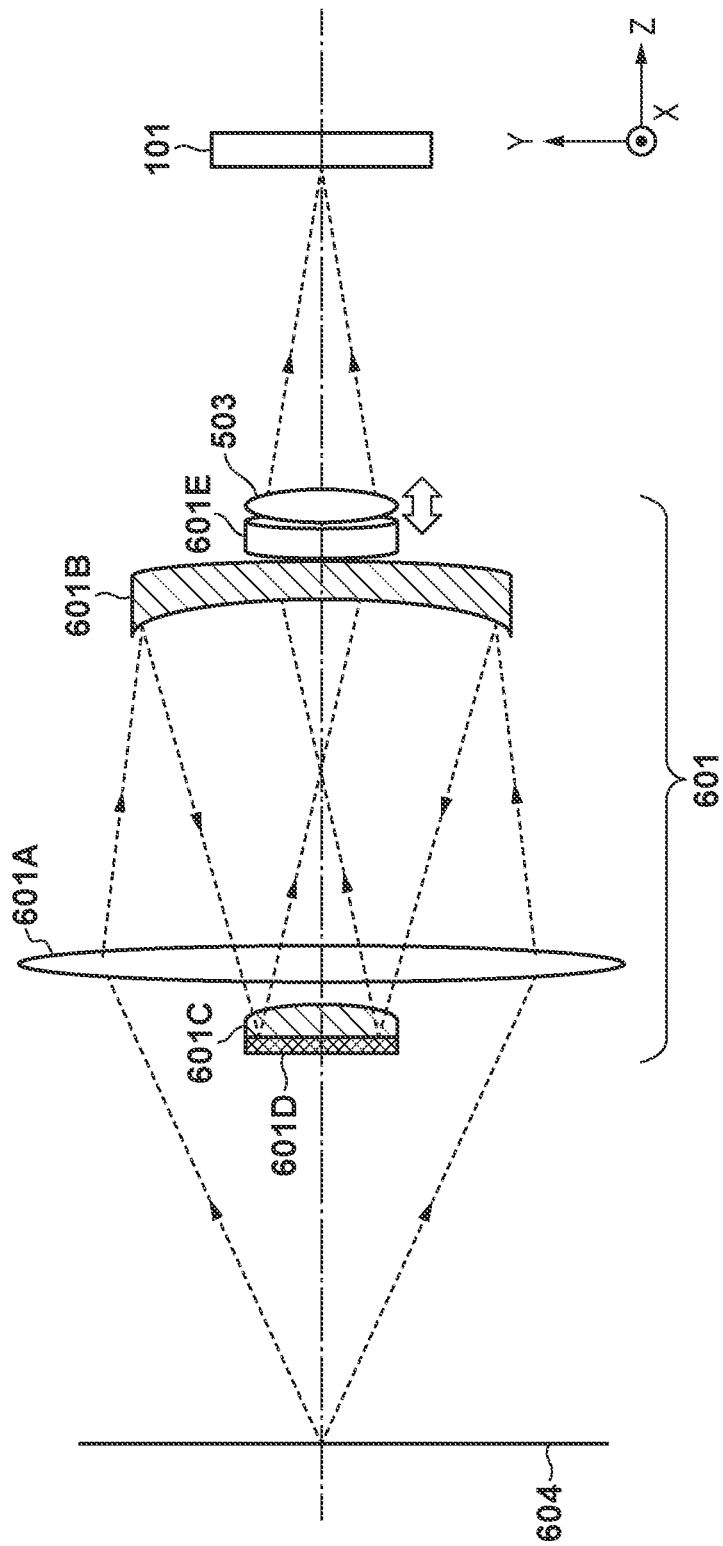
FIG. 2 is a configuration diagram of a reflective optical system.

Next, the reflective optical system in the first lens group 601 shown in FIG. 1A will be described with reference to FIG. 2. In FIG. 2, a left solid line indicates a subject 604, and dashed lines indicate light rays emitted from one point of the subject 604. Light emitted from the subject 604 is condensed through the lens 601A and reflected by the lens 601B. Further, light reflected and refracted by the lens 601C passes through the lens 601B, passes through the lens 601E, passes through the previously-described focus lens 503, and is then formed on the image capturing surface of the image sensor 101. The lens 601B is a reflective lens that reflects and causes light to go backward in the optical path in FIG. 2. A light blocking portion 601D is attached to the lens 601C on a surface (the surface on the subject side) opposite to the optical path. In this manner, by folding the optical path within the lens, a lens having a long focal length while having a small outer shape can be realized.

Figure 3A:
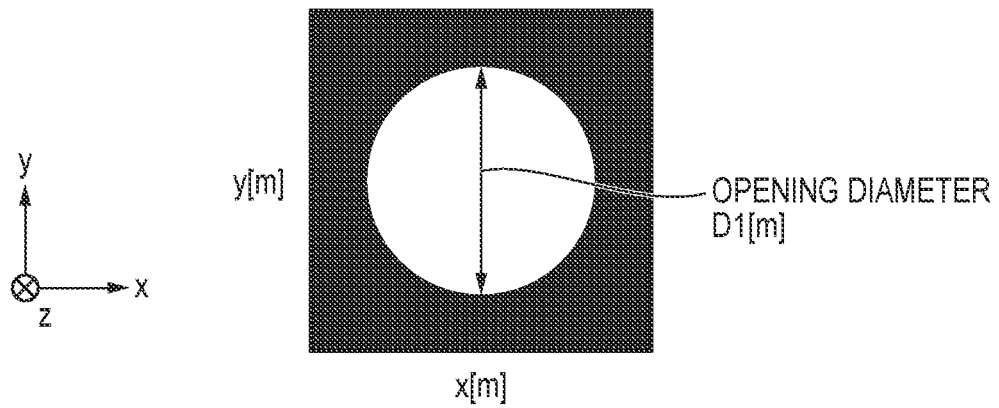
FIGS. 3A to 3C are diagrams for describing a pupil function.
Figure 3B:
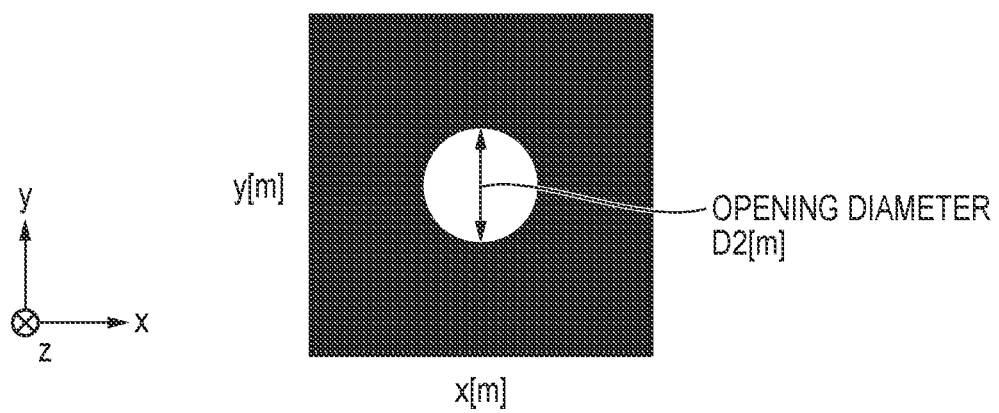
Figure 3C:
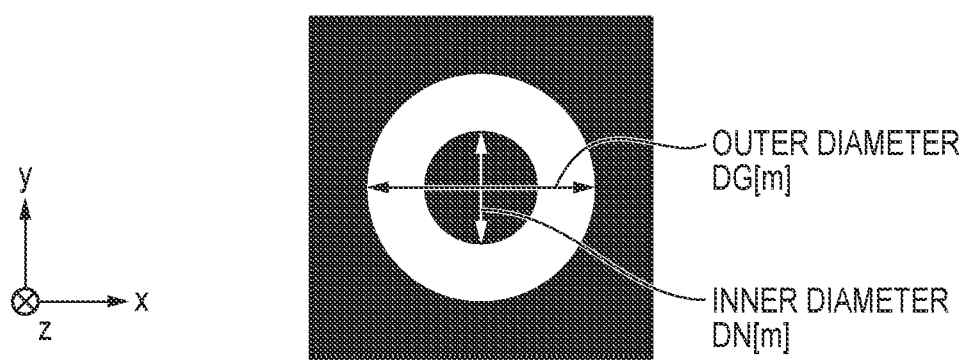

FIGS. 3A to 3C are diagrams for describing a pupil function showing the performance of the lens of the imaging optical system in the present embodiment. The pupil function is the light intensity distribution for an aperture surface at an exit pupil distance of the lens. The black portion in the figure shows a state in which light is blocked at an aperture ratio of 0%, and the white portion in the figure shows an aperture state at an aperture ratio of 100%. Assuming an ideal state in which there are no aberrations in the imaging lens and the aperture shape is an ideal circular shape, the aperture pupil shape (white part in FIG. 3A) becomes a perfect circular shape as shown in FIG. 3A.

Considering correspondence with a capturing F value, in a state where the F value is small (close to an open F value), the opening diameter D1 of the pupil function is large as shown in FIG. 3A, and where the F value is large (narrow state), the opening diameter D2 of the pupil function is small as shown in FIG. 3B. An exit pupil distance z is a lens-specific value, and when the capturing F value is decided, the magnitude of the diameter D of the opening on the exit pupil plane is uniquely decided. The aperture shape for the pupil function of the imaging lens 600 in the present embodiment is a donut shape as shown in FIG. 3C even in a state where there is no aberration because the light ray is blocked by the light blocking portion 601D. An outer side diameter and an inner side diameter in the donut-shaped opening of the pupil functions in FIG. 3C are denoted by outer diameter DG and inner diameter DN, respectively. The magnitudes of the outer diameter DG and the inner diameter DN are also values that are uniquely decided when the exit pupil distance of the imaging lens, the capturing F value, and the diameter of the light blocking portion 601D are decided.

In this case, an MTF indicating the resolution of the imaging lens is represented by an absolute value of an OTF which is an autocorrelation of the pupil function. MTF characteristic diagrams respectively corresponding to the pupil functions in FIGS. 3A to 3C are shown in FIG. 4A to FIG. 4C. For aperture shapes such as shown in FIGS. 3A and 3B, which are generally circular pupil functions, the larger the opening diameter D, the higher the values of the MTFs, which are the vertical axes of FIGS. 4A to 4C. Large values on the vertical axis are synonymous with high resolution of the lens. Since the horizontal axis is frequency, a significant difference occurs in resolution in the high-frequency band between FIG. 4A and FIG. 4B. The frequency at which the MTFs fall to 0 (the resolution limit of the lens) is referred to as the cutoff frequency, and is indicated by COfq1 and COfq2 in FIG. 4A and FIG. 4B respectively. The cutoff frequency also differs depending on the size D of the opening, and is obtained by $COfq=D/2\lambda f$ ($\lambda$: wavelength of light, f: focal length of imaging optical system).

In the case where the pupil function has an ideal circular shape, the cutoff frequency is obtained by the above equation, but in an actual imaging optical system, the imaging aperture is often different from the circular shape, and also differs in accordance with image capturing conditions (aberration, coordinates x, y on the image capturing surface, and the like), and the MTF changes in a complicated manner. In addition, a donut-shaped pupil function of a lens having the reflective optical system in the present embodiment as in FIG. 3C exhibits an MTF characteristic diagram MTF3 as in FIG. 4C. The cutoff frequency COfq3 in FIG. 4C is equal to COfq1 when the outer diameter DG=D1. In other words, the cutoff frequency is a value decided by the magnitude of the outer diameter DG. In the low frequency region, as can be seen from an autocorrelation relation between the pupil function and the MTF, MTF3 approaches an MTF for an opening whose diameter is the difference between the outer diameter and the inner diameter (hereinafter referred to as the inner/outer diameter difference). That is, in FIG. 3C, when DG−DN=D2, MTF3 shown in FIG. 4C shows values close to MTF2 shown in FIG. 4B in the low frequency region (<COfq2). As described above, in the optical system of the present embodiment, although the pupil function has a special shape, since the magnitudes DG and DN of the outer diameter and the inner diameter on the exit pupil plane are values which are decided in accordance with design from the diameter and the open F value of the light blocking portion 601D shown in FIG. 2, the MTF, which is the lens performance, can also be predicted as in FIG. 4C.

If the imaging lens 600 and the camera body 100 are an integrated camera, an MTF which is calculated in advance may be held. On the other hand, in the interchangeable lens system, the imaging lens 600 holds in the nonvolatile memory 510 values of parameters appropriately selected from the magnitude DN of the inner diameter, the magnitude DG of the outer diameter, the pupil function P, the lens exit pupil distance LPO, the lens MTF, and the like. Then, information on the shape of the reflective optical system of the lens is communicated to the camera body 100 via lens-side communication terminal 508 and the camera-side communication terminal 113. Further, as shown in FIG. 5, information of the F value corresponding to the diameter (F value information) may be communicated as a value instead of the magnitude DN of the inner diameter and the magnitude DG of the outer diameter. For example, information may be communicated by setting the magnitude of the outer diameter DG=F2 and the inner/outer diameter difference=F4. In addition, configuration may be taken such that some information in the interchangeable lens system is held in the nonvolatile memory 115 on the camera side, and only some information is communicated from the lens.

Figure 6B:
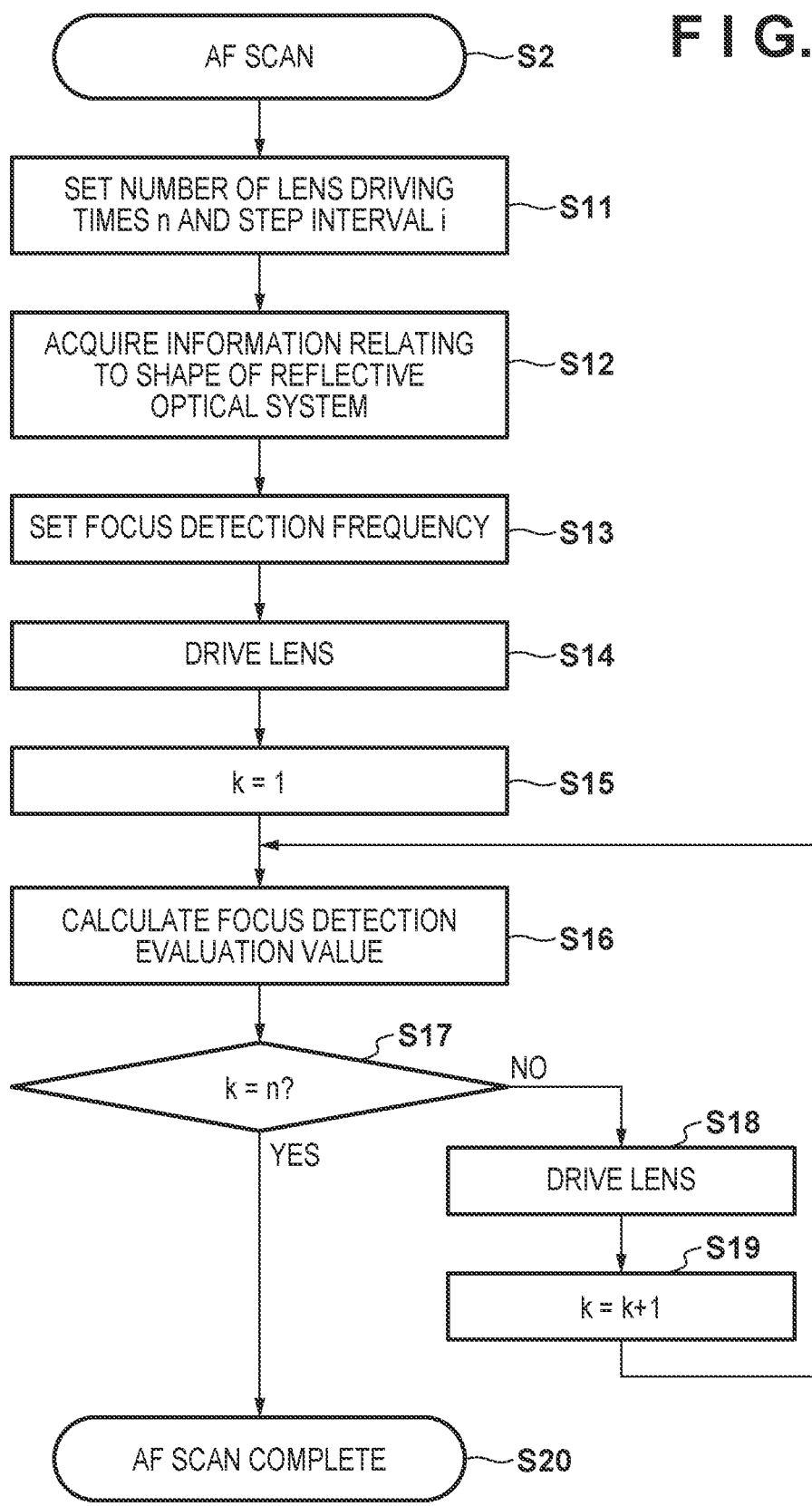

Next, the focus detection operation in the present embodiment will be described with reference to FIGS. 6A to 6C. In the present embodiment, the focus detection operation is generally performed by a technique called contrast AF (autofocus).

First, in step S1 of FIG. 6A, a focus detection region is set. For example, when a captured image as shown in FIG. 7 is obtained by the camera CPU 104, a face in the vicinity of a screen center portion is detected as a main subject, and a focus detection region 10 is set. The size and position coordinates (x, y) of the focus detection region 10 may be arbitrarily set by a photographer, or may be automatically set by a face detection function or the like when a face is included in a captured image as shown in FIG. 7.

Next, in step S2, an AF scan operation is performed. In the AF scan operation, while the focus lens 503 is caused to move along the optical axis, a focus detection evaluation value indicating a degree of focus is calculated with a number of lens driving times n and a step interval i that are set in step S11. Here, the AF scan operation performed in step S2 will be described in detail with reference to the flowchart of FIG. 6B.

First, when the AF scan operation is started, the number of lens driving times n and the step interval i are set in step S11. In contrast AF, the focus evaluation value is acquired while the focus lens is caused to move in the optical axis direction, and the focus lens 503 is caused to stop when the focus evaluation value reaches a local maximum (contrast of the subject is a maximum), to thereby acquire an image that is in focus. Therefore, the number of times of driving n and the step interval i of the focus lens should be set within a range in which the local maximum value of the contrast can be obtained.

Figure 9:
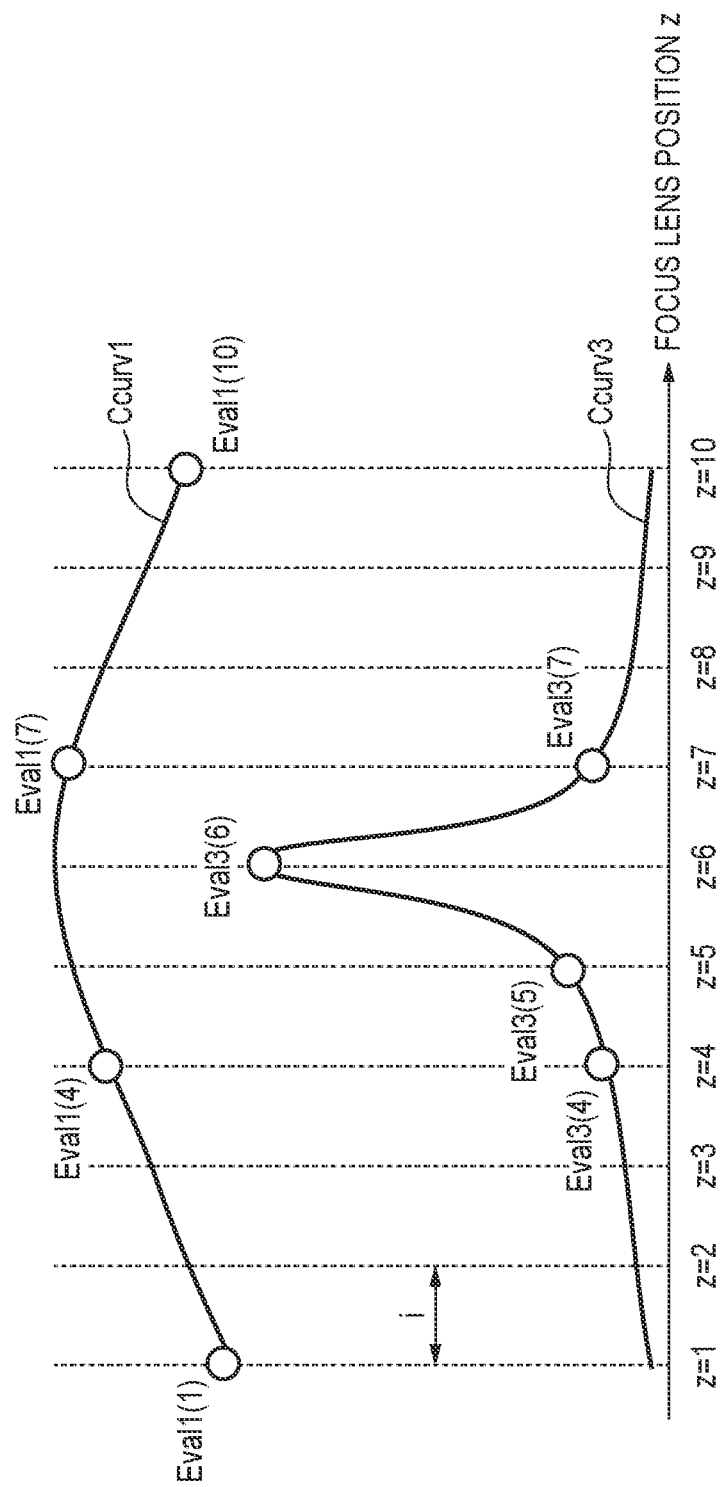
FIG. 9 is a diagram for describing a change in a focus detection evaluation value in accordance with a focus detection band.

For example, assume that, when the focus lens position z is caused to change as indicated by the horizontal axis in FIG. 8, the contrast curve Ccurv is acquired as with Ccurv in FIG. 8, and the focus evaluation values Eval(n) at the respective focus lens positions are obtained. In this case, the number of lens driving times and the step interval set in step S11 may be set with the number of lens driving times n=10 and the step interval=i, or the detection may be stopped with n=7 because it was possible to detect a local maximum value when the number of lens driving times n=7. A method such as the following is a well-known technique. First, as shown in FIG. 9, the local maximum position of an approximate focus evaluation value is found by first coarsely scanning with the number of lens driving times n=4 and a step interval 3i (between Eval1(4) and Eval1(7) on Ccurv1 in FIG. 9). Then, in order to detect the focal position with higher accuracy, the vicinity of the local maximum value is finely scanned with a step interval i (from Eval3(4) to Eval3(7) on Ccurv3 in FIG. 9), thereby obtaining a focal position equivalent to that in FIG. 8. These operations are hereinafter referred to as a coarse scan (coarse scan operation) and a fine scan (fine scan operation). In this instance, in FIG. 9, the number of lens driving times in the coarse scan is 4, the step interval is 3i, the number of lens driving times in the fine scan is 4, and the step interval is i. A method of calculating each focus evaluation value and a method of setting an appropriate contrast curve will be described later.

Next, in step S12, the camera CPU 104 acquires information on the shape of the reflective optical system according to the image capturing condition (zooming, focusing, F value, and image height) from the nonvolatile memory 510 of the imaging lens 600 or the nonvolatile memory 115 of the camera body 100. As described above, the content of the information is appropriately selected from the magnitude DN of the inner diameter, the magnitude DG of the outer diameter, the pupil function P, a lens exit pupil distance LPO, the lens MTF, information of the F value corresponding to the diameter, and the like. The camera CPU 104 acquires these pieces of information from the aforementioned nonvolatile memories 510 or 115, by communication with the imaging lens 600, or by communication within the camera body 100.

Figure 10:
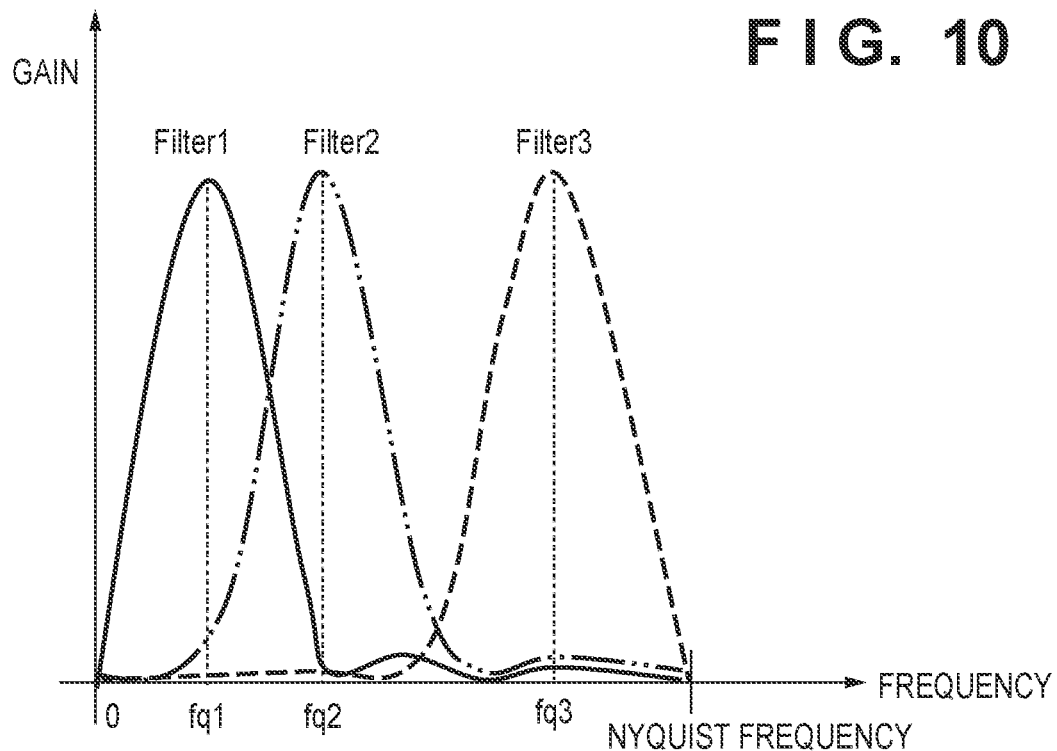
FIG. 10 is a diagram for describing a frequency band of a digital filter.

Next, in step S13, a focus detection frequency is set. Here, a focus detection frequency band of a digital filter is set. FIG. 10 is a diagram showing an example of the frequency band of the digital filter. The Nyquist frequency shown here is a value determined by the pixel pitch of the image sensor 101, and for example, if the pixel pitch of the image sensor 101 is 4 microns, the Nyquist frequency can be obtained as $1/(0.004 \times 2)=125$ (lp/mm: line pairs/millimeter)). This indicates that a subject image finer than 125 (lp/mm) cannot be resolved on the image sensor 101.

In FIG. 10, the horizontal axis represents the frequency, the vertical axis represents the gain, and Filter1 indicated by the solid line has a center frequency fq1. Filter2, Filter3 have higher frequency bands than Filter1, and their center frequencies are fq2 and fq3, respectively. In general, it is indicated that the higher the frequency band, the steeper the contrast evaluation value changes. Therefore, if the focus evaluation value obtained when the filter processing having a frequency characteristic such as Filter1 is performed is the contrast curve Ccurv1 in FIG. 9, the focus evaluation value obtained when the filter processing having a frequency characteristic such as Filter3 is performed becomes a contrast curve Ccurv3 that is sharper than the contrast curve Ccurv1. This is because the lens MTF of a high frequency component has a relatively higher amount of loss than the lens MTF of a low frequency component even with the same amount of blur (amount of driving of the focus lens).

In contrast AF focus detection, since the focus lens is generally driven when the focus evaluation value Eval reaches a local maximum, the shape of the contrast curve Ccurv also greatly affects the focus detection accuracy. For example, in FIG. 9, the focus lens position at which the focus evaluation value is a local maximum during the coarse scan is z=7, while the focus lens position at which the focus evaluation value is a local maximum during the fine scan is z=6. During the coarse scan, it is desirable that Ccurv1 of the contrast curve shows a gradual change because of the wide step interval. This is because, when performing focus detection with a sharp contrast curve Curv3 at the time of a coarse scan, there is a fear that a local maximum value may be missed due to a wide step interval. Therefore, in the case of a coarse scan, it is desirable that the focus detection frequency set in step S13 is in a low range. In contrast, in the case of a fine scan, since the step intervals are narrow, the use of a sharp curve such as the contrast curve Ccurv3 enables detection of a local maximum value of the focus detection evaluation value Eval with high accuracy. Accordingly, it is desirable that the focus detection frequency set in step S13 is in a high range.

Figure 11:
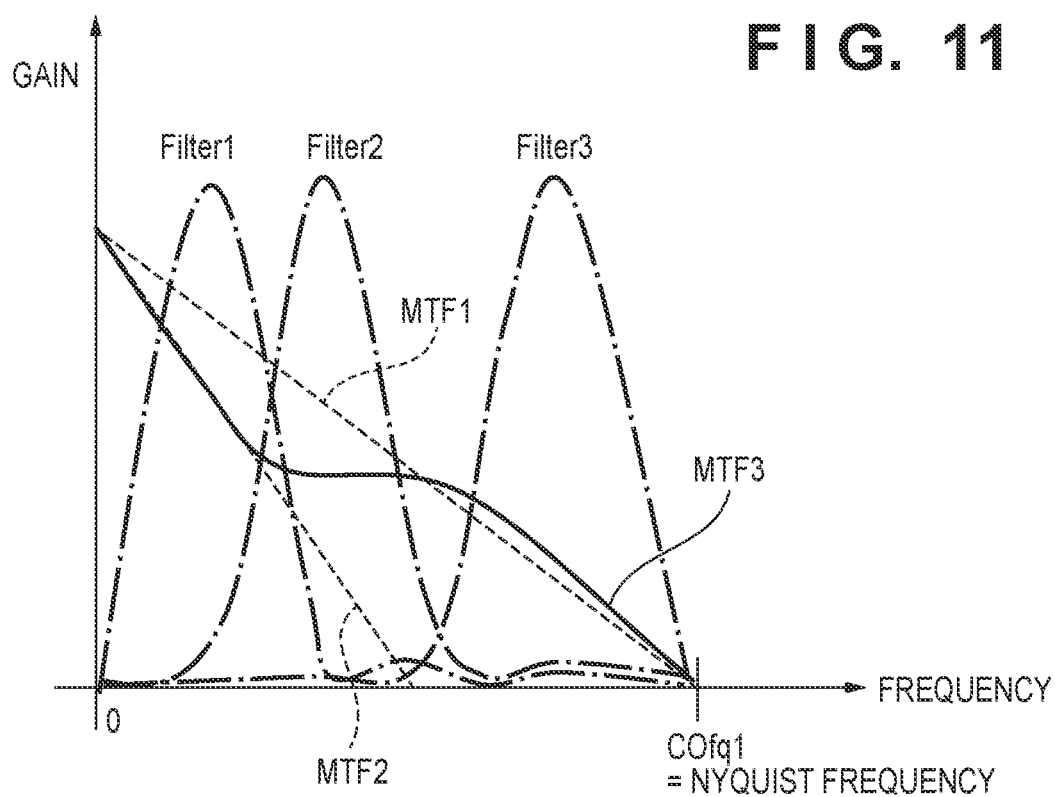
FIG. 11 is a diagram for describing correspondence between an MTF and a digital filter.

Further, the contrast curve Ccurv has values decided by multiplying the focus detection frequency by the MTF of the lens. The MTFs of the lens shown in FIGS. 4A to 4C and the focus detection frequencies shown in FIG. 10 are considered together. Now, assuming that the Nyquist frequency and the cutoff frequency of the lens are the same, it is possible to consider them together on a graph with the frequency on the horizontal axis and the gain on the vertical axis as shown in FIG. 11. In FIG. 11, the frequencies of Filter1, Filter2, and Filter3 are indicated by dashed-dotted lines, MTF1 and MTF2 are indicated by dashed lines, and MTF3 is indicated by a solid line. The MTFs shown here are MTFs of the focus lens position (for example, the focus lens position z=6) for which the focus evaluation value is a local maximum (in-focus state), and respective MTF characteristics are different in a defocus (not in focus) state. However, an MTF gain in the defocus state is lower than the MTF at a time of focus, and the value of the MTF generally gets relatively lower each time the defocus increases. At this time, the contrast evaluation value Eval (z=6) is close to a value proportional to a value resulting from multiplying the gain of the MTF and the gain of Filter.

Figure 12:
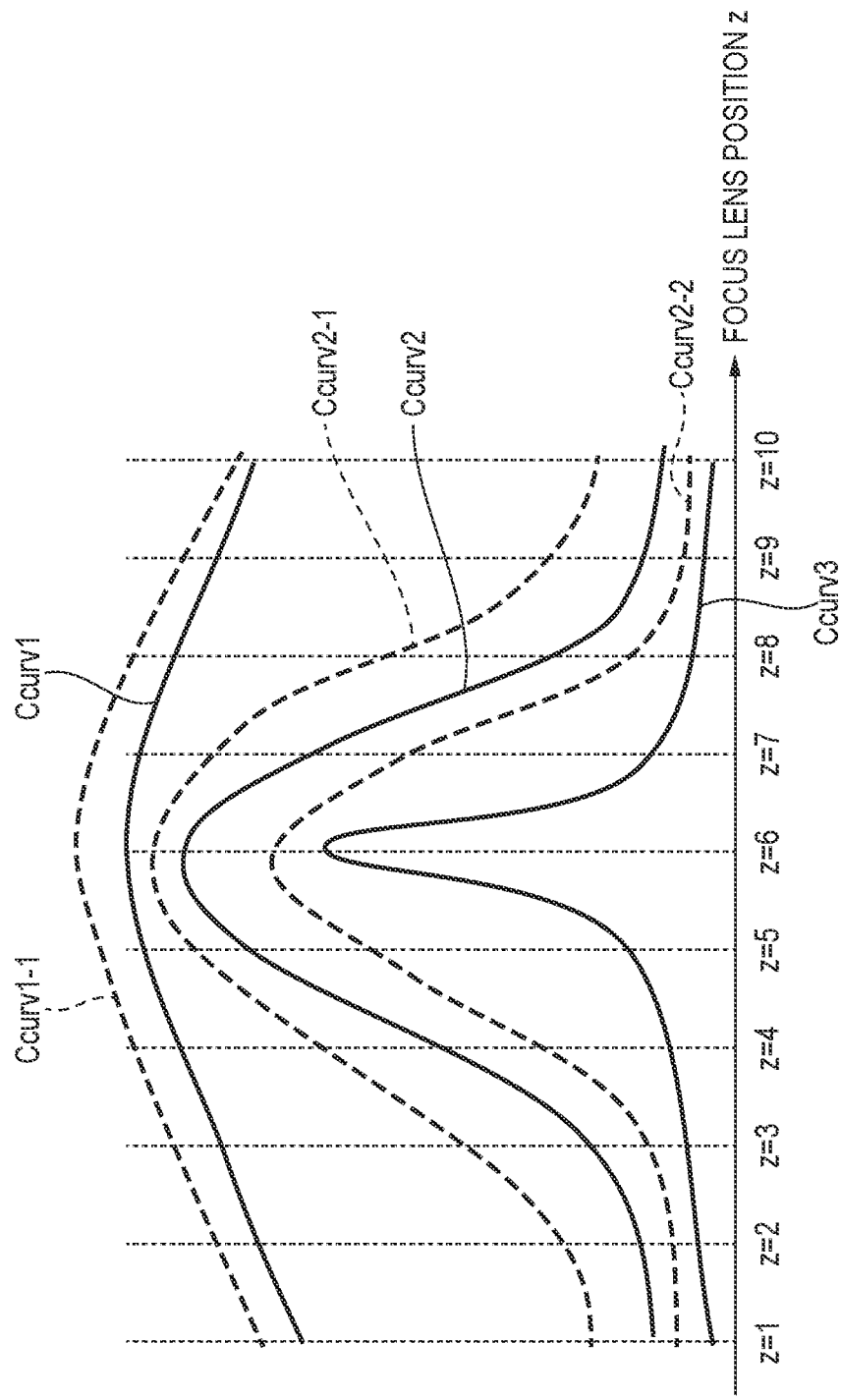
FIG. 12 is a diagram for describing a focus detection evaluation value at various MTF and focus detection bands.

That is, as shown in FIG. 12, the focus evaluation value Eval obtained by applying the digital filter Filter1 is almost unchanged between MTF2 and MTF3, and is Ccurv1. Since the output with MTF1 is higher than with MTF2 or MTF3, the focus evaluation value is also a large output as with Ccurv1-1. Similarly, the focus evaluation values Eval obtained by applying the digital filter Filter2 are respectively different, with Ccurv2-1 for MTF1, Ccurv2 for MTF2, and Ccurv2-2 for MTF3. The focus evaluation value Eval obtained by applying the digital filter Filter3 is Ccurv3 which hardly changes between MTF1 and MTF3, and a focus evaluation value is not obtained with MTF2 because the gain of the MTF is 0 (not shown).

Since the MTFs are known values in accordance with the configuration of the imaging optical system, when performing contrast AF, a desired contrast curve Ccurv can be obtained by appropriately setting the focus evaluation band of the digital filter in advance. At this time, in the case of a special imaging optical system such as a lens having the reflective optical system shown in the present embodiment, the focus detection frequency needs to be set in consideration of the fact that the MTF exhibits change such as with the shape of MTF3.

Figure 14:
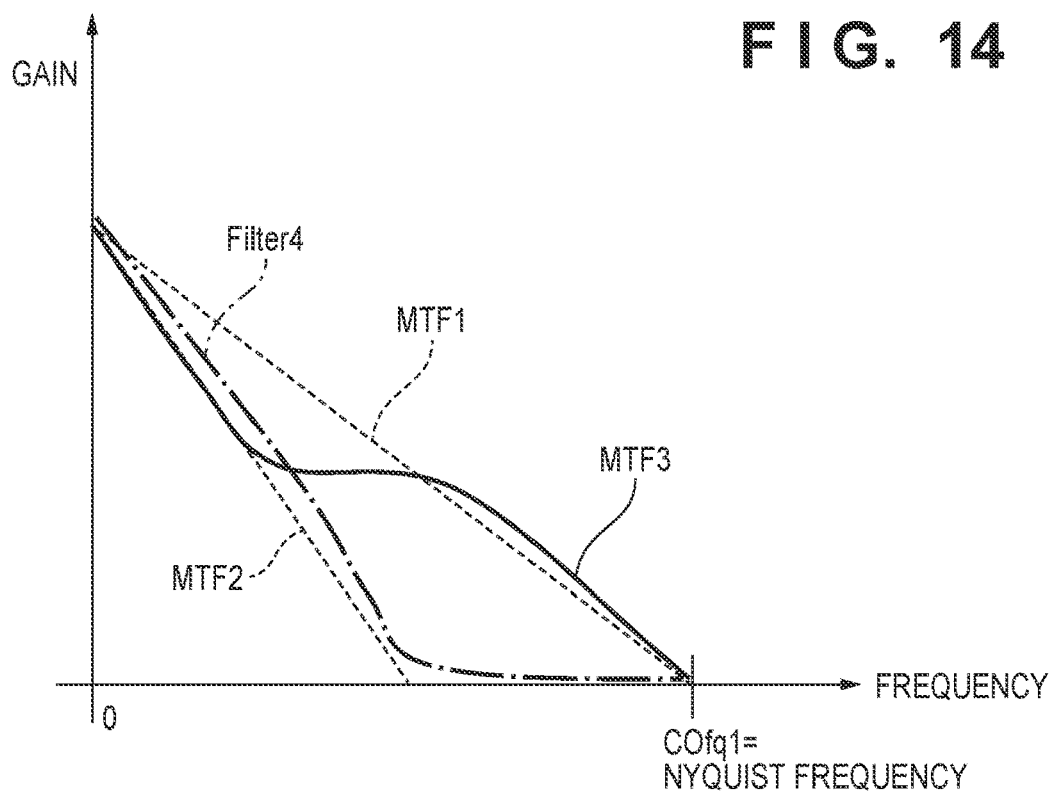
FIG. 14 is a diagram for describing a relationship between MTF and digital filter bands.

In an interchangeable lens system, in a case where the digital filter selected at a time of a coarse scan and a fine scan by the general imaging lens 500 is set as in the left column of FIG. 13 and if, for example, a capturing F value corresponding to the inner/outer diameter difference and the inner diameter of the imaging lens 600 having the reflective optical system of the present embodiment is communicated, an entry in the table shown by the thick frame of FIG. 13 is referred to. That is, it is sufficient to select the same Filter1 as for F4.0 corresponding to the inner/outer diameter difference F4 during a coarse scan, and select the same Filter3 as for F2.0 corresponding to the outer diameter difference F2 during a fine scan. As described above, in step S13, the signal processing method for a case of obtaining the focus evaluation value is switched in accordance with the information on the shape of the reflective optical system of the imaging lens 600. Here, the method of switching the digital filter has been described, but the step interval i may be set in accordance with information on the shape of the reflective optical system of the imaging lens 600. In addition, when low-pass Filter4 as shown in FIG. 14 is applied to MTF3 of the imaging lens 600, the characteristic becomes the same as that of MTF2, and therefore, it can be treated as the same characteristic as that of F4.0 of a normal lens.

Next, in step S14, the focus lens 503 is driven along the optical axis by a movement interval of one step of an AF scan. In step S15, a variable k indicating the number of times the focus lens 503 has been driven is set to 1.

Figure 15:
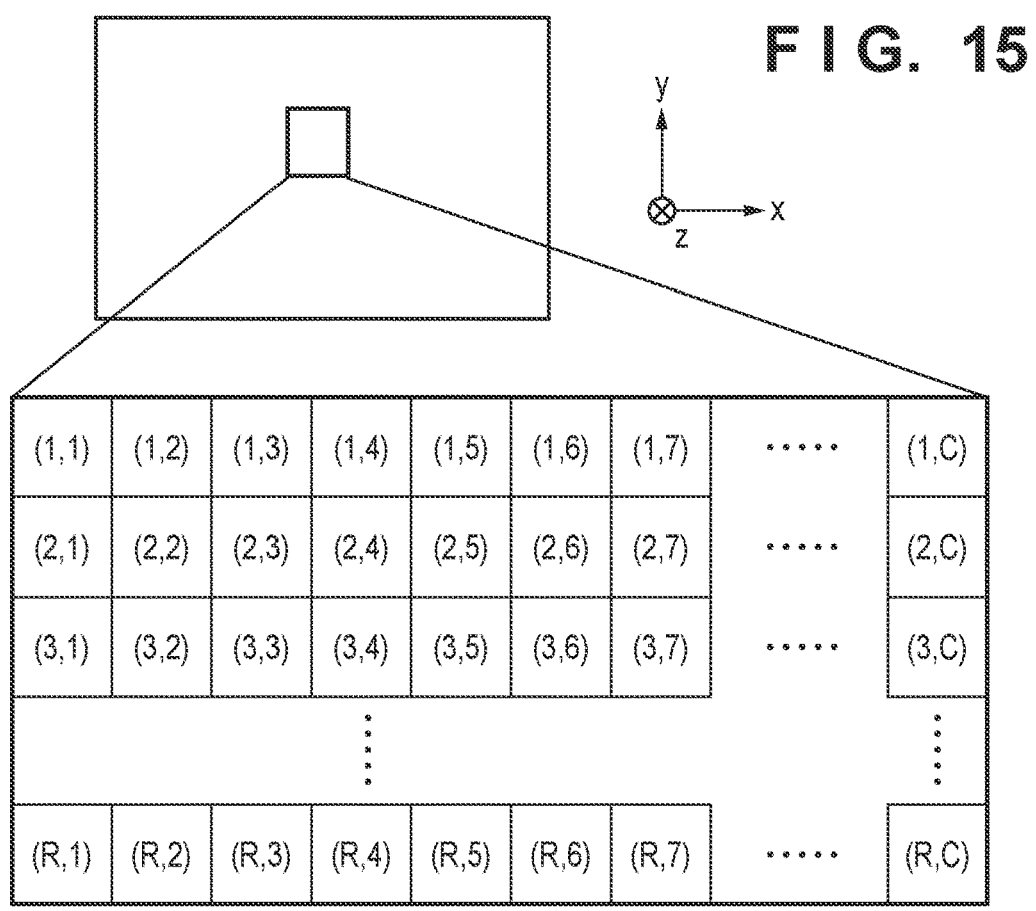
FIG. 15 is a diagram for describing a pixel signal for a focus detection region.

Next, in step S16, a focus evaluation value Eval is calculated. Here, the focus evaluation values Eval at the respective focus lens positions z are obtained by performing, for example, a convolution operation of the digital filters shown in step S13 with respect to the focus detection region set in step S1. For example, if Filter1 set in step S13 has the filter taps of (TAP1, TAP2, TAP3) and the pixel values gaso(x, y) in the focus detection region are in the array shown in FIG. 15, a pixel array value f(x, y) after the digital filter calculation can be obtained by:

$$f(x,y)=TAP1 \times gaso(x,y)+TAP2 \times gaso(x+1,y+1)+TAP3 \times gaso(x+2,y+2)$$

The number of taps (here, 3) (TAP1, TAP2, TAP3) may be set in accordance with the focus detection frequency described above in step S13. For example, the focus detection evaluation value Eval is obtained by calculating the largest absolute value among the pixel values of f(x, y) after the filter operation.

The method of calculating the focus evaluation value described here is an example, and the digital filter may be two-dimensional, and the focus evaluation value for each line may be obtained. Further, the focus evaluation value Eval may be obtained by performing a Fourier transform or the like of the image signal and then applying the digital filter gain of FIG. 10, and the method is not relevant as long as the focus evaluation value Eval indicating contrast in the image can be indicated. In addition, the band setting of the digital filter may be performed in conjunction with change of the recording frequency, depending on an addition state of the image signal (for a still image, for a live view display, for a moving image, and so on).

Next, in step S17, it is determined whether or not the variable k has reached the number of lens driving times n set in step S11. If the variable k has reached the number of lens driving times n, the processing proceeds to step S20 to end the AF scan operation, and if not, the processing proceeds to step S18 where the focus lens 503 is driven by one step of the AF scan.

In step S19, the variable k is incremented, and the processing returns to step S16. Then, the operations of step S16 to step S18 are repeated until the variable k becomes equal to the number of lens driving times n set in step S11.

As described above, when the AF scan is divided into a coarse scan and a fine scan, the operations of step S13 to step S19 are performed twice: once for the coarse scan and once for the fine scan.

Returning to the description of FIG. 6A, in step S3, the peak position calculation is performed from the focus evaluation values Eval obtained in step S16. When focus evaluation values Eval as shown in FIG. 8 are obtained, the focus lens position z=6 may be set as the focus evaluation value peak position (in-focus position) with Eval(6) which is the local maximum value as the focus evaluation value peak. However, for higher accuracy, a focus lens position P, which is a peak position of the focus evaluation value equivalent to performing an interpolation calculation using the focus evaluation value Eval in the vicinity of the local maximum value of the focus evaluation value, the step intervals, and the focus lens position z is obtained. A method of calculating the interpolation may be by linear interpolation, or a local maximum value may be obtained by high-order approximation from the obtained discrete focus evaluation value Eval.

In the example of FIG. 8, an interpolation calculation is performed by linear interpolation using three points in the vicinity of the local maximum value, and it is calculated that there is a local maximum value between the focus lens positions z=5 and z=6, and the focus lens position P is in the vicinity of z=5.7. Here, a focus detection method that uses contrast AF has been described, but the focus detection method is not limited to this technique, and a phase difference detection method may be used.

Next, in step SS1, the camera CPU 104 calculates various correction values, and corrects the focus detection result (focus lens position P) obtained in step S3. The correction value for performing this correction is hereinafter referred to as a best focus correction value (simplified as BP correction value below). Hereinafter, the AF correction process (best focus correction process) will be described in detail with reference to the flowchart shown in FIG. 6C.

First, in step SS11, a parameter (calculation condition) required for calculation of the BP correction value is acquired. The BP correction value changes in conjunction with a change in the imaging optical system or a change in the focus detection optical system, such as a change in the position of the focus lens 503 or a change in the position coordinates (x1, y1) of the focus detection region. Therefore, in step SS11, the camera CPU 104 acquires, for example, information such as the position of the focus lens 503 and the position coordinate (x1, y1) of the focus detection region.

Next, in step SS12, the camera CPU 104 acquires the BP correction information. The BP correction information here corresponds to the aberration information of the optical system, and is, for example, information relating to the image forming position of the imaging optical system for each color, direction, and spatial frequency of the subject.

Figure 16A:
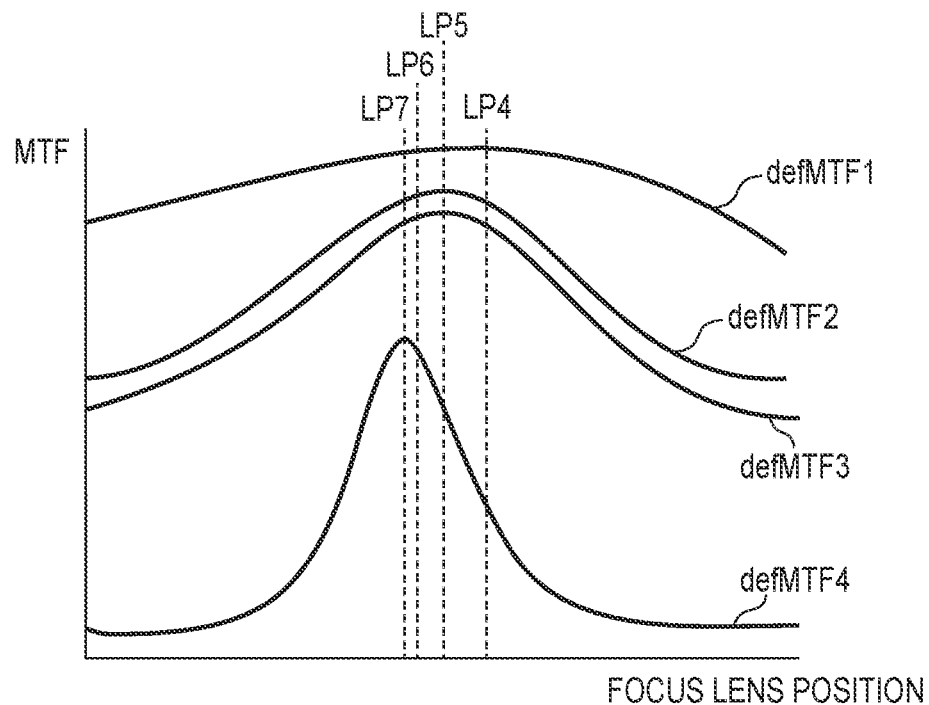
FIG. 16A is a view for describing BP correction information and weighting coefficients.

An example of the aberration information stored in the nonvolatile memory 510 in the imaging lens 600 will be described with reference to FIGS. 16A to 16D. FIG. 16A shows defocus MTFs of an imaging optical system. The horizontal axis represents the position of the focus lens, and the vertical axis represents the intensity of the MTF. The four curves depicted in FIG. 16A illustrate a case where there is an MTF curve for each spatial frequency, where the spatial frequency changes from lower to higher in order of defMTF1, defMTF2, defMTF3, defMTF4. The MTF curve of the spatial frequency F1 (lp/mm: line pair/millimeter) corresponds to defMTF1, and likewise the MTF curves of the spatial frequencies F2, F3, and F4 (lp/mm) correspond to defMTF2, defMTF3, and defMTF4. LP4, LP5, LP6, and LP7 indicate focus lens positions corresponding to the local maximum value of respective defocus MTF curves.

Figure 16B:
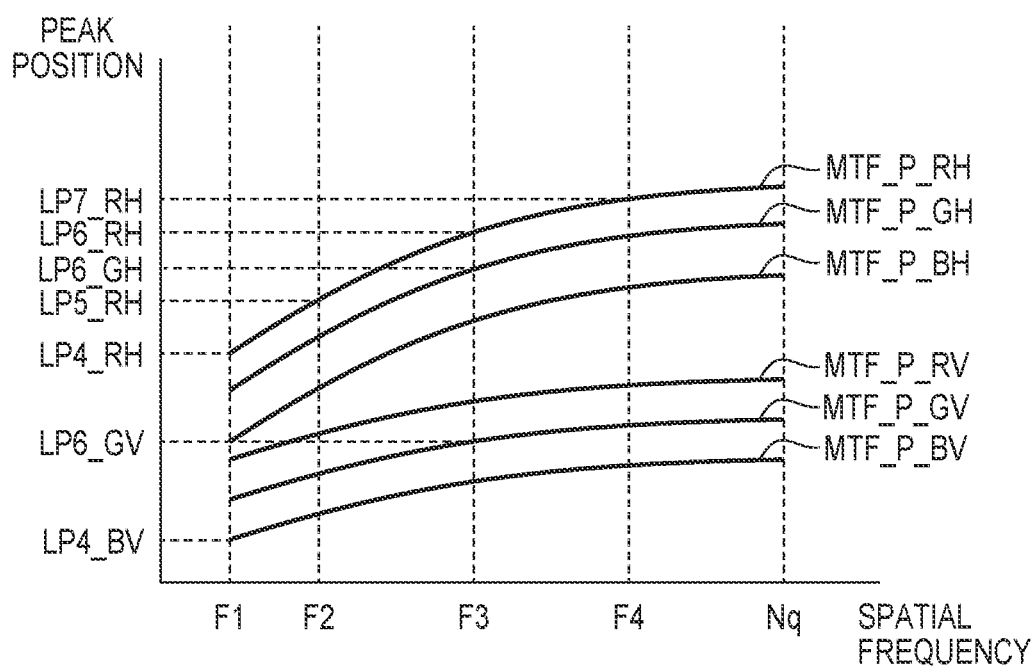
FIG. 16B is a view for describing BP correction information and weighting coefficients.

FIG. 16B shows an example of BP (best focus) correction information (aberration information) in the present embodiment. FIG. 16B shows a value of information MTF_P_RH of the position of the focus lens 503 indicating the local maximum value of the defocus MTF of FIG. 16A. The BP correction information here is expressed by, for example, the following equation which uses as variables the spatial frequency f and the position coordinates (x, y) of the focus detection region on the image sensor 101, for each of six combinations of colors (red, green, blue) and directions (horizontal, vertical).

$$MTF\_P\_RH(f,x,y) = (rh(0) \times x + rh(1) \times y + rh(2)) \times f_2 + (rh(3) \times x + rh(4) \times y + rh(5)) \times f + (rh(6) \times x + rh(7) \times y + rh(8)) \quad (1)$$

Equation (1) represents the equation of the information MTF_P_RH of the focus lens position indicating the local maximum value of the defocus MTF for each spatial frequency corresponding to the horizontal (H) direction with respect to the red (R) color signal, but the other combinations are represented by similar equations. In the present embodiment, it is assumed that the coefficients rh(n) (0≤n≤8) of the respective terms are stored in advance in the nonvolatile memory 510 in the imaging lens 600, and the camera CPU 104 requests the lens CPU 507 to acquire rh(n) (0≤n≤8). However, rh(n) (0≤n≤8) may be stored in the nonvolatile memory 115 in the camera body 100.

The coefficients (rv, gh, gv, bh, bv) for each combination of red and vertical (MTF_P_RV), green and horizontal (MTF_P_GH), green and vertical (MTF_P_GV), blue and horizontal (MTF_P_BH), and blue and vertical (MTF_P_BV) are similarly stored. The camera CPU 104 can then acquire these values from the imaging lens 600. By turning the BP correction information into a function and storing the coefficients of respective terms as the BP correction information in this manner, it is possible to acquire the BP correction information (aberration information) corresponding to the change of the imaging optical system and the change of the focus detection optical system while reducing the amount of data in the nonvolatile memories 510 and 115.

Next, in step SS13, weighting coefficients are set. FIG. 16D shows an example of the weighting coefficients. These weighting coefficients are pieces of information indicating the magnitude of the weighting for each combination of the direction (horizontal, vertical) of the contrast, the color (red, green, blue) and the spatial frequency for evaluating the focus state. The setting information has different information for focus detection and for a captured image. For example, in the case of correcting the result of contrast AF using only the green signal in the horizontal direction on the image sensor 101, only MTF_P_GH is used at the time of focus detection when considering FIG. 16B. Therefore, the weighting coefficients may be defined as:

K_AF_H=1

K_AF_V=0

K_AF_R=0

K_AF_G=1

K_AF_B=0

By setting such weighting coefficients, it is possible to show that the peak information (aberration information) of the defocus MTF of the focus detection signal is the same as the characteristic of the green signal in the horizontal direction.

In contrast, the setting information for the captured image can be defined as, for example,

K_IMG_H=1

K_IMG_V=1

K_IMG_R=0.3

K_IMG_G=0.6

K_IMG_B=0.1

While examples, these values are weighting coefficients for converting an RGB signal to be equivalent to a Y signal, and are values set on the assumption that a captured image is evaluated by the Y signal and the contrast in both the horizontal and vertical directions is evaluated equally. However, setting values, types of setting values, and the like are not limited thereto.

Next, in step SS13, the camera CPU 104 calculates a weighting coefficient K_AF_fq(n) of the spatial frequency, which is information on the evaluation frequency of a signal used for acquiring a focus detection result, and K_IMG_fq(n) which is information on the evaluation frequency of a signal used for a captured image. Here, the greater n is, the better the accuracy, but n can be set to an arbitrary number.

With reference to FIGS. 17A to 17F, description is given regarding methods of calculating the AF evaluation band K_AF_fq(n) and the captured image evaluation band K_IMG_fq(n). FIGS. 17A to 17F all show the intensity of light for each spatial frequency, with the horizontal axis indicating the spatial frequency and the vertical axis indicating the intensity of light.

Figure 17C:
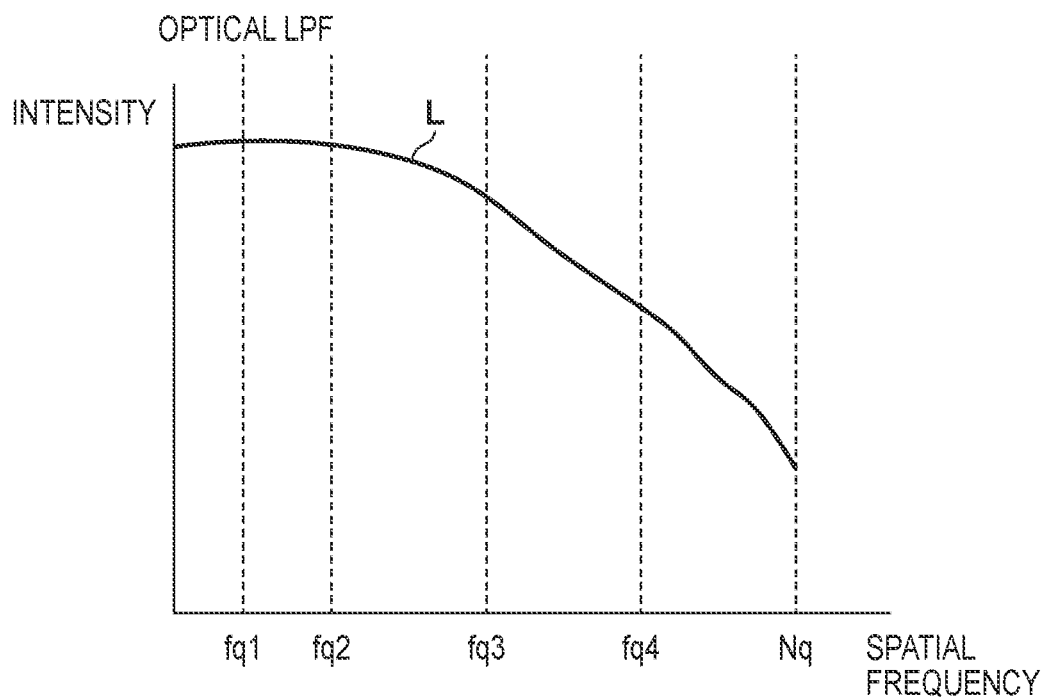
FIG. 17C is a diagram for describing a method of calculating weighting coefficients.

First, FIG. 17A shows an example of a spatial frequency characteristic I of a subject. fq1, fq2, fq3, fq4 on the horizontal axis represents the spatial frequencies set in FIG. 16D. Nq represents a Nyquist frequency determined by the pixel pitch of the image sensor 101. fq1 to fq4 and Nq are similarly shown in FIGS. 17B to 17F which are described later.

The spatial frequency characteristic I of the subject shown in FIG. 17A may be detected according to the subject for which focus detection is performed. It is possible to, in the focus detection region set in step S1 of FIG. 6A, perform FFT processing or the like on the captured image signal so that spatial frequency information of the subject as shown in FIG. 17A is obtained. With such processing, the substance of the calculation processing increases, but since the correction value corresponding to the subject for which the focus detection is performed can be calculated, the focus adjustment can be performed with high accuracy. In addition, several kinds of spatial frequency characteristics stored in advance may be selectively used in a simpler manner depending on the magnitude of the contrast information of the subject.

FIG. 17B shows a spatial frequency characteristic O of the imaging optical system. This optical information may be acquired from the nonvolatile memory 510 through the lens CPU 507, and stored in the nonvolatile memory 115 in the camera body 100. The information stored at this time may be the spatial frequency characteristic for each defocus state, or may be only the spatial frequency characteristic for a time of focusing. Generally, since the BP correction value is calculated when close to being in-focus, if the spatial frequency characteristic at a time of being in-focus is used, it is possible to perform correction with high accuracy. However, although the calculation load increases, the focus adjustment can be performed with higher accuracy by using the spatial frequency characteristic for each defocus state.

In FIG. 17B, the spatial frequency characteristic O of the imaging optical system is depicted by a curve, and values corresponding to discrete spatial frequencies fq1, fq2, fq3, fq4 are expressed as O(n) (1≤n≤4). The spatial frequency characteristic O of the imaging optical system here becomes a spatial frequency characteristic like MTF3 shown in FIG. 4C in the imaging lens 600 having the reflective optical system of the present embodiment. For lenses having no general reflective optical system, the spatial frequency characteristic for FIG. 4A, FIG. 4B is as shown by the dashed lines in FIG. 17B. However, in the present embodiment, as described above, since the special MTF shape is due to the reflective optical system, the spatial frequency characteristic O of the imaging optical system is set in accordance with the special MTF shape. The spatial frequency characteristic O of the reflective optical system may be acquired by communication of values stored in the nonvolatile memory 510 from the lens CPU 507. Alternatively, configuration may be taken to receive only a notification from the lens CPU that there is the reflective optical system 507, and use the spatial frequency characteristic O which is stored in the nonvolatile memory 115 in the camera body 100. Further, the spatial frequency characteristic (O) of the imaging optical system may be obtained for example in accordance with calculation from the magnitude DN of the inner diameter, the magnitude DG of the outer diameter, the pupil function P, and the lens exit pupil distance LPO acquired in step S12 of FIG. 6B.

FIG. 17C shows a spatial frequency characteristic L of an optical low-pass filter disposed in front of the image sensor 101. This information is stored in the nonvolatile memory 115 in the camera body 101. In FIG. 17C, the spatial frequency characteristic L of the optical low-pass filter is depicted by a curve, and values corresponding to discrete spatial frequencies fq1, fq2, fq3, fq4 are expressed as L(n) (1≤n≤4).

Figure 17D:
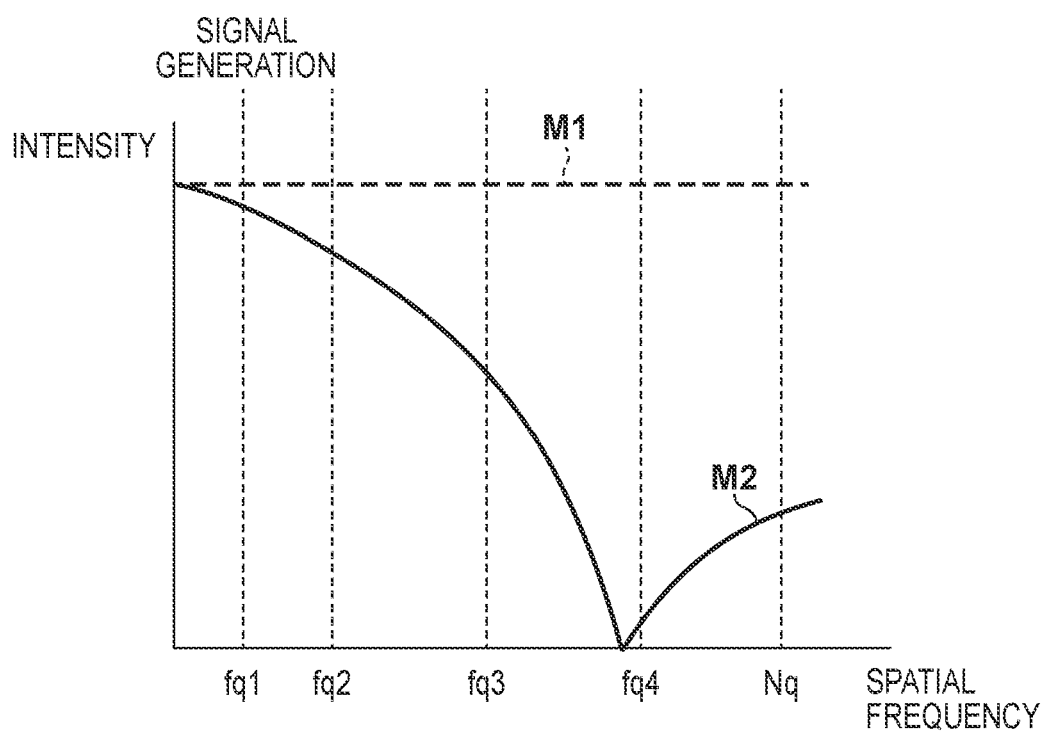
FIG. 17D is a diagram for describing a method of calculating weighting coefficients.

FIG. 17D shows two kinds of spatial frequency characteristics (M1, M2) in accordance with signal generation: for focus detection, and for a captured image. As a signal for a captured image, it is common to read signals of all pixels of an image sensor and acquire an image of high resolution. On the other hand, in order to reduce the processing load for the focus detection operation, it is common to perform a thinning readout (down-sampling acquisition of the image sensor signal) on the signal for focus detection.

Figure 17E:
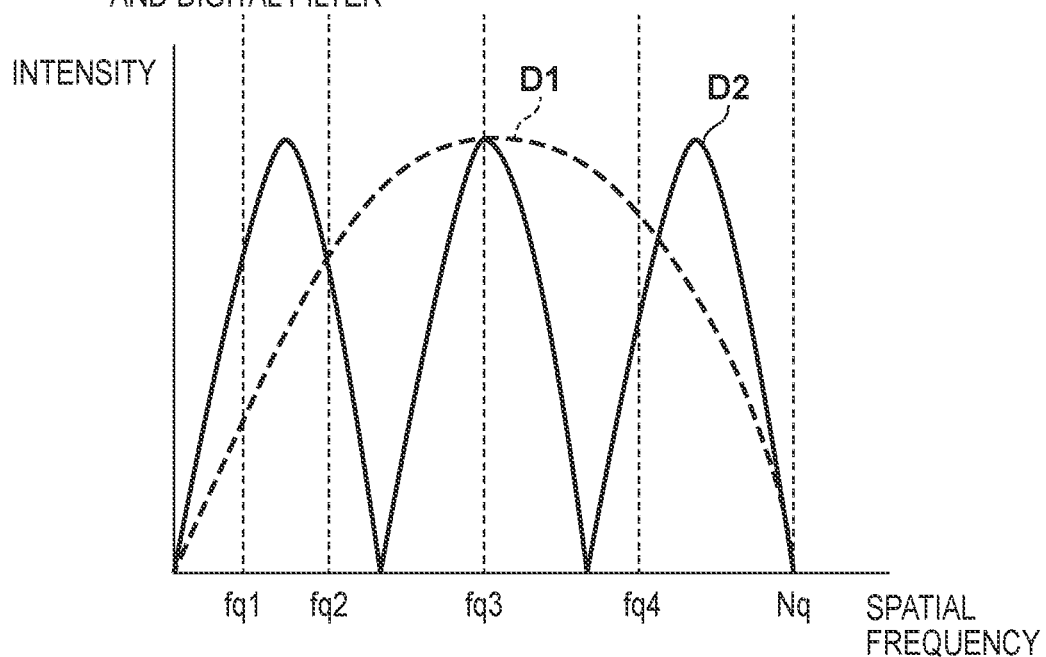
FIG. 17E is a diagram for describing a method of calculating weighting coefficients.

In a first readout mode for the captured image acquired here, that is, in an all-pixel readout mode, the spatial frequency characteristic does not change when the signal is generated. M1 in FIG. 17D shows the spatial frequency characteristic for a case of the first readout mode. On the other hand, in a second readout mode for focus detection, that is, in a thinning readout mode, the spatial frequency characteristic changes at a time of signal generation. Specifically, in order to achieve an improvement of S/N by adding a signal when thinning the signal of the image sensor, a low-pass effect is generated by the addition. M2 in FIG. 17D shows the spatial frequency characteristic when generating a signal of the second readout mode. Here, the influence of thinning which is taken into account in FIG. 17E is not considered, and only a low-pass effect in accordance with addition is shown. In FIG. 17D, the spatial frequency characteristics in accordance with signal generation (M1 and M2) are depicted by curves, and values corresponding to discrete spatial frequencies fq1, fq2, fq3, fq4 are expressed as M1($n$) and M2($n$) (1≤$n$≤4).

FIG. 17E shows a spatial frequency characteristic D1 indicating sensitivity for each spatial frequency when viewing a captured image and a spatial frequency characteristic D2 of a digital filter used when processing an AF evaluation signal. The sensitivity for each spatial frequency at the time of viewing the captured image is affected by a viewing environment such as individual differences between viewers, image size, viewing distance, and brightness. In the present embodiment, the sensitivity for each spatial frequency at the time of viewing is set and stored as a representative value.

In contrast, in a case of the second readout mode, aliasing noise of the frequency component of the signal is generated due to an effect of the thinning. In consideration of the influence, D2 is what indicates the spatial frequency characteristic of the digital filter.

In FIG. 17E, the spatial frequency characteristic D1 for a time of viewing and the spatial frequency characteristic D2 of the digital filter are depicted by curves, but values corresponding to the discrete spatial frequencies fq1, fq2, fq3, fq4 are represented as D1($n$) and D2($n$) (1≤$n$≤4).

As described above, various pieces of information are stored in one of the nonvolatile memory 115 of the camera body 101 and the nonvolatile memory 510 of the imaging lens 600, and the camera CPU 104 acquires this information by communication. The camera CPU 104 uses the acquired values to calculate a captured image evaluation band K_IMG_fq and the AF evaluation band K_AF_fq using the following equations.

$$K\_IMG\_fq(n)=I(n)\times O(n)\times L(n)\times M1(n)\times D1(n) \quad (1\le n\le 4) \quad (2)$$

$$K\_AF\_fq(n)=I(n)\times O(n)\times L(n)\times M2(n)\times D2(n) \quad (1\le n\le 4) \quad (3)$$

Figure 17F:
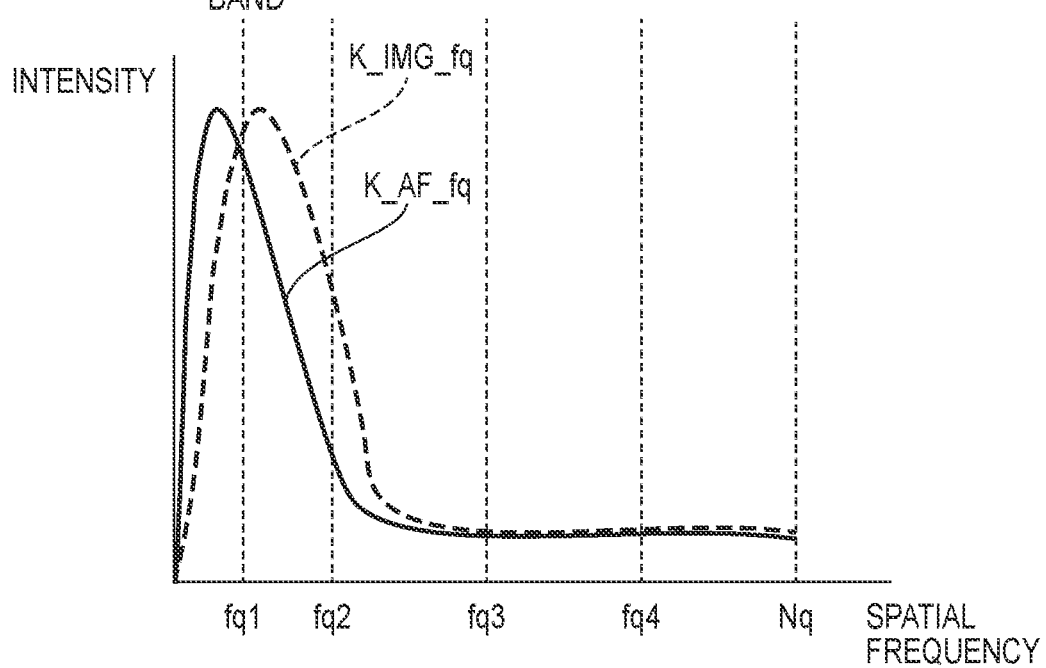
FIG. 17F is a diagram for describing a method of calculating weighting coefficients.

FIG. 17F shows a captured image evaluation band K_IMG_fq and an AF evaluation band K_AF_fq. By performing calculations as in Equation (2) and Equation (3), it is possible to quantify the degree of influence of each spatial frequency on a factor for deciding the in-focus state of the captured image. Similarly, it is possible to quantify the degree of influence of the error of the focus detection result for each spatial frequency.

Also, it is not necessary to perform all these calculations every time focus detection is performed. For example, since the spatial frequency characteristic I of the subject differs every time of focus detection, even though an update is performed every time, the spatial frequency characteristic L of the optical LPF, a signal generation method M, and the spatial frequency characteristic D may be calculated in advance and stored as a value resulting from multiplying them together. In addition, for example, the spatial frequency characteristic O of the imaging optical system characteristic in the present embodiment may be acquired and updated when the lens is mounted.

In FIGS. 17A to 17F, description is given using four spatial frequencies (fq1 to fq4) for clarity of the description. However, the greater the number of spatial frequencies for which there is data, the higher the resolution at which the spatial frequency characteristics of the captured image and the AF evaluation band can be reproduced, and the higher the accuracy at which the correction value can be calculated. On the other hand, the amount of calculation can be reduced by reducing the spatial frequency for which weighting is performed. It is also possible to performing the following calculations by having one respective spatial frequency representing the spatial frequency characteristic for each of the captured image evaluation band and the AF evaluation band.

Next, in step SS14, a BP correction value is calculated from the weighting coefficients set in step SS13 and the BP correction information acquired in step SS12.

More specifically, first, the position information (x1, y1) of the focus detection region is assigned to x and y in Equation (1). By this calculation, Equation (1) is expressed in the form of the following Equation (4).

$$MTF\_P\_RH(f)=Arh\times f_2+Brh\times f+Crh \quad (4)$$

The camera CPU 104 performs similar calculations for MTF_P_RV(f), MTF_P_GH(f), MTF_P_GV(f), MTF_P_BH(f), and MTF_P_BV(f).

FIG. 16B shows an example of BP correction information after the position information of the focus detection region is substituted in S1 of FIG. 6A, where the horizontal axis indicates the spatial frequency, and the vertical axis indicates the position (peak position) of the focus lens 503 indicating the local maximum value of the defocus MTF. As shown in FIG. 16B, when chromatic aberration is large, the curves for each color deviate, and when an astigmatism aberration (vertical/horizontal difference) is large, the curves in the horizontal direction and the vertical direction in the figure deviate. As described above, in the present embodiment, there is defocus MTF information corresponding to the spatial frequency for each combination of a color (R, G, and B) and an evaluation direction (H, V).

Next, the BP correction information is weighted by the coefficients constituting the focus detection information acquired in step SS13 (FIG. 16D). As a result, the aberration information is weighted with respect to the color and direction to be evaluated in focus detection and capturing. More specifically, the spatial frequency characteristic MTF_P_AF (f) for focus detection and the spatial frequency characteristic MTF_P_IMG(f) for a captured image are calculated using Equations (5) and (6).

$$\begin{aligned}\text{MTF\_P\_AF}(f) = & \text{K\_AF\_R} \times \text{K\_AF\_H} \times \text{MTF\_P\_RH}(f) + \\ & \text{K\_AF\_R} \times \text{K\_AF\_V} \times \text{MTF\_P\_RV}(f) + \text{K\_AF\_G} \times \\ & \text{K\_AF\_H} \times \text{MTF\_P\_GH}(f) + \text{K\_AF\_G} \times \text{K\_AF\_V} \times \\ & \text{MTF\_P\_GV}(f) + \text{K\_AF\_B} \times \text{K\_AF\_H} \times \\ & \text{MTF\_P\_BH}(f) + \text{K\_AF\_B} \times \text{K\_AF\_V} \times \\ & \text{MTF\_P\_BV}(f) \end{aligned} \quad (5)$$

$$\begin{aligned}\text{MTF\_P\_IMG}(f) = & \text{K\_IMG\_R} \times \text{K\_IMG\_H} \times \text{MTF\_} \\ & \text{P\_RH}(f) + \text{K\_IMG\_R} \times \text{K\_IMG\_V} \times \text{MTF\_P\_RV} \\ & (f) + \text{K\_IMG\_G} \times \text{K\_IMG\_H} \times \text{MTF\_P\_GH}(f) + \\ & \text{K\_IMG\_G} \times \text{K\_IMG\_V} \times \text{MTF\_P\_GV}(f) + \\ & \text{K\_IMG\_B} \times \text{K\_IMG\_H} \times \text{MTF\_P\_BH}(f) + \\ & \text{K\_IMG\_B} \times \text{K\_IMG\_V} \times \text{MTF\_P\_BV}(f) \end{aligned} \quad (6)$$

In FIG. 16C, for the discrete spatial frequencies F1 to F4, the vertical axes indicate the focus lens positions (peak positions) LP4_AF, LP5_AF, LP6_AF, and LP7_AF at which the defocus MTF obtained by substituting into Equation (5) and Equation (6) is a peak (local maximum value).

Next, the in-focus position (P_img) of the captured image and the in-focus position (P_AF) detected by the AF operation are calculated according to Equation (7) and Equation (8) below. For the calculation, the defocus MTF information MTF_P(n) and the evaluation bands K_IMG_fq and K_AF_fq obtained in step SS13 are used.

$$\begin{aligned}\text{P\_img} = & \text{MTF\_P\_IMG}(1) \times \text{K\_IMG\_FQ}(1) + \\ & \text{MTF\_P\_IMG}(2) \times \text{K\_IMG\_FQ}(2) + \text{MTF\_P\_IMG} \\ & (3) \times \text{K\_IMG\_FQ}(3) + \text{MTF\_P\_IMG}(4) \times \\ & \text{K\_IMG\_FQ}(4) \end{aligned} \quad (7)$$

$$\begin{aligned}\text{P\_AF} = & \text{MTF\_P\_AF}(1) \times \text{K\_AF\_FQ}(1) + \text{MTF\_P\_AF} \\ & (2) \times \text{K\_AF\_FQ}(2) + \text{MTF\_P\_AF}(3) \times \text{K\_AF\_FQ} \\ & (3) + \text{MTF\_P\_AF}(4) \times \text{K\_AF\_FQ}(4) \end{aligned} \quad (8)$$

That is, with the respective captured image and AF evaluation bands K_IMG_FQ and K_AF_FQ calculated in step SS13, the camera CPU 104 performs a weighted addition of the respective local maximum value information MTF_P_IMG and MTF_P_AF of the defocus MTF for each spatial frequency shown in FIG. 16C. Thereby, the in-focus position (P_img) of the captured image and the in-focus position (P_AF) detected by the AF are calculated.

Next, the camera CPU 104 calculates the BP correction value (BP) by the following equation (9).

$$\text{BP} = \text{P\_AF} - \text{P\_img} \quad (9)$$

In step SS15, by the above, the calculation of the BP correction value which depends on aberration of the imaging optical system finishes.

Next, in step S4, focus determination (in-focus state determination) of the peak position of each focus detection region is performed, and the process proceeds to step S5. Here, the presence or absence of the local maximum value of the AF evaluation value with respect to the focus lens position is determined, and the focus lens position in the case where a local maximum value is present is calculated. Further, the reliability of a change curve of the AF evaluation value in the vicinity of the local maximum value is evaluated. In this reliability evaluation, it is determined whether the obtained AF evaluation value has taken a local maximum value because the optical image of the subject is formed on the image sensor 101 or has taken a local maximum value due to other external disturbance.

As a detailed method of focus determination, for example, a method as described in FIG. 10 to FIG. 13 of Japanese Patent Laid-Open No. 2010-078810 may be used. That is, whether or not the AF evaluation value indicating the in-focus state is mountain-shaped is determined based on the difference between the largest value and the smallest value of the focus evaluation value, the length of a portion inclined at an inclination equal to or more than a predetermined value (SlopeThr), and the gradient of the inclined portion. By this, it is possible to perform focus determination. If the focus determination is not good, the in-focus indication in step S6 is displayed as out-of-focus, or the AF scan operation of step S2 is redone.

Next, in step S5, the focus lens 503 is driven in the optical axis direction to a position obtained by adding the BP correction value obtained in step SS1 to the focus lens position P obtained in step S3.

Finally, in step S6, an in-focus indication is made. When the focus determination is OK in step S4, an in-focus indication (for example, a green box is displayed) is made in the focus detection region of FIG. 7 to inform a user of the end of the focus detection operation. When the focus determination is OK in step S4, an out-of-focus indication (for example, a red box is displayed) is made in the focus detection region of FIG. 7 to inform a user of the end of the focus detection operation. The above operation is performed and the focus adjustment operation completes.

As described above, according to the present embodiment, focus adjustment can be performed with high accuracy even in an image capturing apparatus having a lens that includes a reflective optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-105608, filed Jun. 5, 2019 which is hereby incorporated by reference herein in its entirety.

What is claimed is:

1. An image capturing apparatus, comprising:
an image sensor configured to capture a subject image; and
at least one processor or circuit configured to function as
a focus detection unit configured to, based on an image signal obtained by photoelectrically converting the subject image in accordance with the image sensor while performing a scan operation that causes a focus lens included in an imaging optical system to move along an optical axis of the imaging optical system, calculate a focus evaluation value indicating a degree of focus of a subject and detect a position of the focus lens at which the focus evaluation value is a maximum, and
a calculation unit configured to, in a case where the imaging optical system includes a reflective optical system in which a part of a light beam is blocked, calculate, based on information on the reflective optical system and information on an image forming position of the imaging optical system for each of a plurality of different spatial frequencies, a correction value for correcting a focus detection result of the focus detection unit.

2. The image capturing apparatus according to claim 1, wherein the calculation unit calculates the correction value based on information about an evaluation frequency of a signal used by the focus detection unit to acquire the focus detection result and information about an evaluation frequency of a signal used for a captured image.

3. The image capturing apparatus according to claim 1, wherein the information on the reflective optical system is information indicating that the imaging optical system is a lens having the reflective optical system.

4. The image capturing apparatus according to claim 3, wherein the calculation unit calculates the correction value for correcting the focus detection result of the focus detection unit based on information corresponding to the reflective optical system stored in a storage unit in a main body of the image capturing apparatus.

5. The image capturing apparatus according to claim 1, wherein the information on the reflective optical system is information on a pupil function of the reflective optical system.

6. The image capturing apparatus according to claim 5, wherein the information on the reflective optical system is information on an inner diameter and an outer diameter corresponding to the pupil function at an exit pupil plane of the reflective optical system.

7. The image capturing apparatus according to claim 6, wherein the information on the reflective optical system is F value information corresponding to the inner diameter and the outer diameter.

8. The image capturing apparatus according to claim 1, wherein the information on the reflective optical system is information on an MTF of the reflective optical system.

9. The image capturing apparatus according to claim 1, wherein the focus detection unit, based on information on the shape of the reflective optical system, sets a focus detection frequency for a case of calculating the focus detection result.

10. A camera system in which an imaging lens is configured to be detachably attached to a camera body, wherein
the imaging lens includes a reflective optical system in which a part of a light beam is blocked, and has a storage device that stores information on the reflective optical system and information on an image forming position of the imaging lens for each of a plurality of different spatial frequencies, and
the camera body has an image sensor configured to capture a subject image, and
at least one processor or circuit configured to function as
a focus detection unit configured to, based on an image signal obtained by photoelectrically converting the subject image in accordance with the image sensor while performing a scan operation that causes a focus lens included in the imaging lens to move along an optical axis of the imaging lens, calculate a focus evaluation value indicating a degree of focus of a subject and detect a position of the focus lens at which the focus evaluation value is a maximum; and a calculation unit configured to calculate, based on information on the reflective optical system and information on an image forming position of the imaging lens for each of a plurality of different spatial frequencies, a correction value for correcting a focus detection result of the focus detection unit.

11. A method for controlling an image capturing apparatus provided with an image sensor operable to capture a subject image, the method comprising:
based on an image signal obtained by photoelectrically converting the subject image in accordance with the image sensor while performing a scan operation that causes a focus lens included in an imaging optical system to move along an optical axis of the imaging optical system, performing focus detection in which a focus evaluation value indicating a degree of focus of a subject is calculated and a position of the focus lens at which the focus evaluation value is a maximum is detected; and
in a case where the imaging optical system includes a reflective optical system in which a part of a light beam is blocked, calculating, based on information on the reflective optical system and information on an image forming position of the imaging optical system for each of a plurality of different spatial frequencies, a correction value for correcting a focus detection result of the focus detection.

12. A non-transitory computer-readable storage medium storing a program for causing a computer to execute each step of a method of controlling an image capturing apparatus provided with an image sensor operable to capture a subject image, the method comprising:
based on an image signal obtained by photoelectrically converting the subject image in accordance with the image sensor while performing a scan operation that causes a focus lens included in an imaging optical system to move along an optical axis of the imaging optical system, performing focus detection in which a focus evaluation value indicating a degree of focus of a subject is calculated and a position of the focus lens at which the focus evaluation value is a maximum is detected; and
in a case where the imaging optical system includes a reflective optical system in which a part of a light beam is blocked, calculating, based on information on the reflective optical system and information on an image forming position of the imaging optical system for each of a plurality of different spatial frequencies, a correction value for correcting a focus detection result of the focus detection.

* * * * *